(12) United States Patent
Takehara et al.

(10) Patent No.: US 11,001,011 B2
(45) Date of Patent: May 11, 2021

(54) METHOD OF PRODUCING FIBER REINFORCED COMPOSITE MATERIAL

(71) Applicant: Toray Industries, Inc., Tokyo (JP)

(72) Inventors: Tomohiro Takehara, Iyo-gun (JP); Masato Honma, Iyo-gun (JP); Terry Sakurai Brown, Iyo-gun (JP); Noriyuki Hirano, Iyo-gun (JP)

(73) Assignee: Toray Industries, Inc., Tokyo (JP)

( * ) Notice: Subject to any disclaimer, the term of this patent is extended or adjusted under 35 U.S.C. 154(b) by 132 days.

(21) Appl. No.: 16/079,259

(22) PCT Filed: Feb. 14, 2017

(86) PCT No.: PCT/JP2017/005364
§ 371 (c)(1),
(2) Date: Aug. 23, 2018

(87) PCT Pub. No.: WO2017/145872
PCT Pub. Date: Aug. 31, 2017

(65) Prior Publication Data
US 2019/0054706 A1   Feb. 21, 2019

(30) Foreign Application Priority Data

Feb. 23, 2016 (JP) .............................. JP2016-031662
Feb. 23, 2016 (JP) .............................. JP2016-031663

(51) Int. Cl.
*B29C 70/12* (2006.01)
*B29C 43/18* (2006.01)
(Continued)

(52) U.S. Cl.
CPC ............. *B29C 70/12* (2013.01); *B29C 43/18* (2013.01); *B29C 70/44* (2013.01); *B29C 70/50* (2013.01);
(Continued)

(58) Field of Classification Search
CPC ......... B29C 70/12; B29C 43/18; B29C 70/44; B29C 70/50; B29C 70/504; B29C 70/523;
(Continued)

(56) References Cited

U.S. PATENT DOCUMENTS 4,859,524 A * 8/1989 Kim ...................... B29C 70/086
442/35
6,124,220 A * 9/2000 Nakata ................ B32B 37/0038
428/206
(Continued)

FOREIGN PATENT DOCUMENTS

AU         3357771 A      3/1973
AU         449 338 B2     5/1974
(Continued)

OTHER PUBLICATIONS

The First Office Action dated Nov. 26, 2019, of counterpart Chinese Application No. 201780012893.3, along with an English translation.

(Continued)

*Primary Examiner* — Nahida Sultana
(74) *Attorney, Agent, or Firm* — DLA Piper LLP (US)

(57) ABSTRACT

A method of producing a fiber reinforced composite material satisfies condition 1: a thermosetting resin base material (B) includes a thermosetting resin (a) and a nonwoven fabric-shaped base material (a thermosetting resin base material satisfying the condition 1 is referred to as a thermosetting resin base material (B-1)); and condition 2: the thermosetting resin base material (B) is a base material including the thermosetting resin (a), and a porous sheet-shaped base material (b) or a film-shaped base material (c), the thermosetting resin (a) has a viscosity of 1,000 Pa·s or more at 40° C., and the thermosetting resin (a) has a minimum viscosity of 10 Pa·s or less during heating from 30° C. at a temperature rise rate of 1.5° C./min (a thermosetting resin base material (Continued)

satisfying the condition 2 is referred to as a thermosetting resin base material (B-2)).

20 Claims, 7 Drawing Sheets

(51) Int. Cl.
*C08J 5/24* (2006.01)
*B29C 70/44* (2006.01)
*B29C 70/50* (2006.01)
*B29C 70/52* (2006.01)
*B29K 101/00* (2006.01)

(52) U.S. Cl.
CPC .......... *B29C 70/504* (2013.01); *B29C 70/523* (2013.01); *B29C 70/528* (2013.01); *C08J 5/24* (2013.01); *B29K 2101/00* (2013.01); *B29K 2313/00* (2013.01)

(58) Field of Classification Search
CPC ....... B29C 70/528; B29C 43/52; B29C 43/58; B29C 70/18; B29C 70/345; B29C 70/467; C08J 5/24; C08J 5/04; B29K 2101/00; B29K 2313/00
See application file for complete search history.

(56) References Cited

U.S. PATENT DOCUMENTS

| | | | | |
|---|---|---|---|---|
| 7,244,501 | B2* | 7/2007 | Raghavendran | B32B 5/28 428/412 |
| 2004/0102115 | A1* | 5/2004 | Chou | B32B 5/28 442/134 |
| 2006/0035548 | A1 | 2/2006 | Goto et al. | |
| 2007/0269638 | A1* | 11/2007 | Arai | B32B 27/12 428/142 |
| 2010/0228001 | A1 | 9/2010 | Mortimer | |
| 2010/0314807 | A1* | 12/2010 | Lengsfeld | B29C 70/543 264/571 |
| 2012/0115388 | A1* | 5/2012 | Baidak | C08J 5/24 442/393 |
| 2014/0070452 | A1* | 3/2014 | Akiyama | B29C 70/48 264/257 |
| 2015/0098833 | A1* | 4/2015 | Pointer | C08J 5/24 416/226 |
| 2015/0119498 | A1* | 4/2015 | Seegel | B05D 3/12 523/400 |
| 2015/0148451 | A1 | 5/2015 | Harada et al. | |
| 2015/0360426 | A1* | 12/2015 | Radanitsch | B29C 70/443 264/78 |
| 2016/0326690 | A1* | 11/2016 | Rozant | B32B 25/20 |
| 2018/0361682 | A1* | 12/2018 | Mortimer | B32B 5/00 |

FOREIGN PATENT DOCUMENTS

| | | |
|---|---|---|
| CN | 101181828 A | 5/2008 |
| CN | 101410244 | 4/2009 |
| CN | 104379629 A | 2/2015 |
| EP | 2314434 A2 | 4/2011 |
| EP | 3 263 332 A1 | 1/2018 |
| EP | 3 263 630 A1 | 1/2018 |
| EP | 3 263 631 A1 | 1/2018 |
| EP | 3 263 632 A1 | 1/2018 |
| JP | 09-011401 A | 1/1997 |
| JP | 2002-234078 A | 8/2002 |
| JP | 2003-011231 A | 1/2003 |
| JP | 2003-071856 A | 3/2003 |
| JP | 2004-099731 A | 4/2004 |
| JP | 2006-305867 A | 11/2006 |
| JP | 2008-246981 A | 10/2008 |

OTHER PUBLICATIONS

Kao Shen-bin, "Hot Expansion Soft Die Forming Method" in *Satellite Manufacturing Technology*, China Astronautics Publishing House, Sep. 30, 1998, pp. 309-314, and 325, along with a partial English translation.
The Extended European Search Report dated Oct. 1, 2019, of counterpart European Application No. 17756312.9.
Office Action dated Sep. 9, 2020, of counterpart Taiwanese Application No. 106105575, along with a machine English translation.
Notice of Allowance dated Oct. 20, 2020, of counterpart Chinese Application No. 201780012893.3, along with an English translation.

* cited by examiner (i)

(ii)

(iii)

METHOD OF PRODUCING FIBER REINFORCED COMPOSITE MATERIAL

TECHNICAL FIELD

This disclosure relates to a method of producing a fiber reinforced composite material capable of improving the productivity of a molded article excellent in formativeness without impairing the quality.

BACKGROUND

Fiber reinforced composite materials made from a reinforced fiber and a matrix resin are excellent in specific strength and specific rigidity, and are widely applied from aircraft structural members to pressure vessels and golf shafts. Demand of such fiber reinforced composite materials in automotive components has been increasing year by year particularly because of their contribution to weight reduction.

A generally employed method of producing a fiber reinforced composite material is a molding method of laminating prepregs obtained by impregnating continuous reinforced fiber bundles with a matrix resin, and then heating and pressurizing the resulting laminate to cure the matrix resin. Although prepregs provide molded articles excellent in quality because they are capable of being impregnated with a matrix resin uniformly and accurately, the prepregs are poor in formativeness into complicated shapes such as an uneven shape and a standing wall because the matrix resin constrains reinforced fibers.

Under such circumstances, as a method of producing a fiber reinforced composite material capable of being shaped into a complicated shape such as an automotive component, there have been proposed a resin transfer molding (RTM) method (Japanese Patent Laid-open Publication No. 2003-71856) and a resin film infusion (RFI) method (Japanese Patent Laid-open Publication No. 2003-11231), in both of which a resin-free fiber-reinforced base material is used.

The RTM method is a method of producing a fiber reinforced composite material excellent in formativeness by producing a preform obtained by shaping a resin-free fiber-reinforced base material into a predetermined shape, placing the preform in a die, then injecting a liquid thermosetting resin into the die, and curing the thermosetting resin while supplying the resin to the fiber-reinforced base material.

The RFI method is a method of producing a fiber reinforced composite material excellent in formativeness by laminating a resin-free fiber-reinforced base material and a film of an uncured thermosetting resin in a die, liquefying the film by heating and pressurization, and then curing the thermosetting resin while supplying the resin to the fiber-reinforced base material.

In addition, Japanese Patent Laid-open Publication No. 2002-234078 proposes a method of producing a fiber reinforced composite material excellent in formativeness by laminating, in a die, a resin-free fiber-reinforced base material and a resin supporting body obtained by heating an uncured thermosetting resin to bring the thermosetting resin into a semi-cured state (B stage) and making a soft foam absorb the semi-cured resin, and then completing the curing while supplying the semi-cured thermosetting resin to the fiber-reinforced base material by heating and pressurization.

Further, Japanese Patent Laid-open Publication No. 2006-305867 proposes a method of producing a fiber reinforced composite material excellent in formativeness by laminating, in a die, a resin-free fiber-reinforced base material and a preform obtained by making a soft foam absorb an uncured thermosetting resin and then cooling the resulting product to solidify the product into a desired shape, then liquefying the thermosetting resin by heating and pressurization, and curing the thermosetting resin while supplying the resin to the fiber-reinforced base material.

In the production methods proposed in JP '856, JP '231, JP '078 and JP '867, a textile having good formativeness is suitably used as a fiber-reinforced base material.

Meanwhile, Japanese Patent Laid-open Publication No. 2008-246981 discloses a method of producing a fiber reinforced composite material excellent in surface quality by laminating, in a die, a resin-free fiber-reinforced base material, and a prepreg or sheet molding compound (SMC) containing an uncured thermosetting resin, and then curing the thermosetting resin while flowing the thermosetting resin by heating and pressurization.

In addition, Japanese Patent Laid-open Publication No. 2004-99731 proposes an RFI method of laminating, in a die, a resin-free fiber-reinforced base material and a film obtained by filling an uncured imide oligomer film between perforated polyimide films, then liquefying the imide oligomer by heating and pressurization, and curing the imide oligomer while supplying the imide oligomer to the fiber-reinforced base material.

In the RTM method described in JP '856, however, it is necessary to flow the resin to every corner of the fiber-reinforced base material and impregnate the fiber bundle with the resin in the step of injecting the thermosetting resin. It is also necessary to cure the thermosetting resin at a high speed to improve the productivity, and the method has a technical problem of control of the flow and curing. If the flow is increased, the resin is improved in the impregnating property and the fiber reinforced composite material is excellent in quality, but the resin cures slowly and impairs productivity. On the other hand, if the resin is cured at a high speed, productivity is improved, but the resin is difficult to flow and inhibited from impregnating into the fiber-reinforced base material, resulting in impaired quality. For this reason, conditions of application of the RTM method are currently limited due to both the limitations.

In contrast, in the RFI method described in JP '231, since the thermosetting resin film is laminated, the burden of supplying the resin is greatly reduced, and the resin has only to be in a flowable state during impregnation into fiber bundles. However, the method has a major problem in handleability of the thermosetting resin film. That is, if the film has low rigidity, the film has good formativeness but has an unstable shape, and it is not easy to convey the film due to deformation or collapse caused by its own weight, and the film is difficult to laminate due to stickiness. On the other hand, if the film has high rigidity, the film is difficult to shape although the shape can be ensured. The resin undergoes an extreme temperature-dependent viscosity change, and it is difficult to obtain suitable handleability.

The method described in JP '078 improves the handleability by employing a foam-shaped resin supporting body compared to a thermosetting resin film. Although the method employs a resin that is liquid at room temperature, the method has a new problem of resin leakage during handling such as conveyance, and the method requires a step of semi-curing the thermosetting resin into a non-flowable state by heating. In addition, since the thermosetting resin undergoes a rapid reaction at the B stage, a great burden is imposed on the management of the thermosetting resin in terms of productivity. Moreover, if the thermosetting resin is brought into a non-flowable state, the resin may be remarkably deteriorated in the impregnating property to cause a quality problem.

Further, in the method described in JP '867, a solid resin is handled to cope with the problem in use of a resin that is liquid at room temperature. Thus, the method is required to include a preform step of making a foam material absorb a thermosetting resin, then cooling the resin, and further fixing the shape. This is equivalent to perform molding twice in terms of time and effort, resulting in significant loss of productivity.

Further, the method described in JP '981 is capable of improving the dimensional stability and surface quality of the fiber reinforced composite material by interposing the resin-free fiber-reinforced base material as a buffer material between the prepreg layers. However, the method has a problem of the impregnating property of the resin into the resin-free fiber-reinforced base material. Specifically, the amount of resin supplied from the prepreg to the resin-free fiber-reinforced base material is small, and the amount of the supplied resin may be insufficient to cause a problem of deterioration of the surface quality unless a resin-free fiber-reinforced base material having a small basis weight is used. Moreover, if the molding pressure is increased to squeeze the resin from the prepreg, the prepreg will flow sideways to cause a problem of deterioration of the dimensional stability.

Further, the method described in JP '731 improves handleability of the thermosetting resin that is difficult to form a film by using a bag formed of a thermally stable resin film as a supporting body. The method requires, however, processing of supplying the resin to the bag, and perforating the bag may cause resin leakage or breakage of the bag body during the conveyance, resulting in impaired productivity. On the other hand, if the bag is not perforated, control of the supply of the resin may be difficult to cause a problem of deterioration of the quality of the obtained fiber reinforced composite material.

It could therefore be helpful to provide a method of producing a fiber reinforced composite material capable of improving formativeness and productivity without deteriorating the quality of the molded article by using a thermosetting resin base material capable of suitably impregnating a thermosetting resin into a fiber-reinforced base material and is excellent in handleability.

SUMMARY

Our method of producing a fiber reinforced composite material by impregnating a fiber-reinforced base material (A) with a thermosetting resin (a) and further curing the thermosetting resin (a), includes steps (II) to (IV):

step (II): feeding the fiber-reinforced base material (A) and a thermosetting resin base material (B) satisfying condition 1 and/or condition 2 to a molding mechanism;

step (III): supplying the thermosetting resin (a) from the thermosetting resin base material (B) to the fiber-reinforced base material (A) by pressurization with the molding mechanism to impregnate the fiber-reinforced base material (A) with the thermosetting resin (a); and step (IV): curing the thermosetting resin (a) by heating with the molding mechanism:

condition 1: the thermosetting resin base material (B) includes the thermosetting resin (a) and a nonwoven fabric-shaped base material; and condition 2: the thermosetting resin base material (B) is a base material including the thermosetting resin (a), and a porous sheet-shaped base material (b) or a film-shaped base material (c), the thermosetting resin (a) has a viscosity of 1,000 Pa·s or more at 40° C., and the thermosetting resin (a) has a minimum viscosity of 10 Pa·s or less during heating from 30° C. at a temperature rise rate of 1.5° C./min.

It is possible to provide a method of producing a fiber reinforced composite material capable of improving the formativeness and productivity without deteriorating the quality of the molded article by using a thermosetting resin base material that is capable of suitably impregnating a thermosetting resin into a fiber-reinforced base material and is excellent in handleability.

BRIEF DESCRIPTION OF THE DRAWINGS

FIGS. 13(i) to 13(iii) are schematic views showing a situation in which a porous sheet-shaped base material used in the production method is conveyed with both ends thereof being gripped.

DESCRIPTION OF REFERENCE SIGNS

Figure 1:
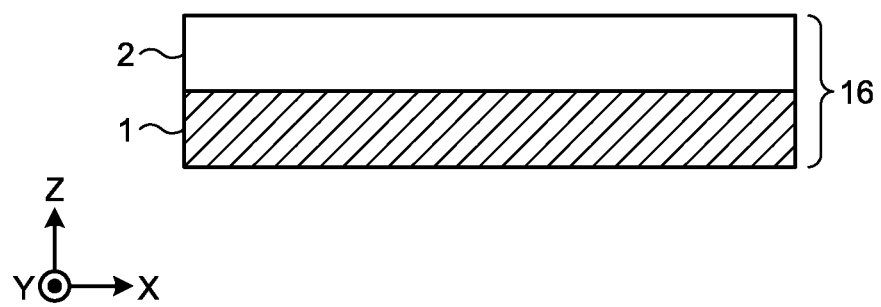
FIG. 1 is a schematic cross-sectional view of one example of a laminate of a fiber-reinforced base material and a thermosetting resin base material that is used in our production method.

1: Thermosetting resin base material
2: Fiber-reinforced base material

3: Preform
4A: Double-sided die (upper die)
4B: Double-sided die (lower die)
5: Blank holder
6: Single-sided die
7: Cover film
8: Suction port
9A: Hollow die (upper die)
9B: Hollow die (lower die)
10: Core die
11: Through die
12: Pressing die
13: Angle
14A: Double belt press (upper belt)
14B: Double belt press (lower belt)
15: Core material
16: Laminate including fiber-reinforced base material and thermosetting resin base material
17: Porous sheet-shaped base material
18: Clamp

DETAILED DESCRIPTION

Hereinafter, methods of producing a fiber reinforced composite material will be described.

First Version

The method of producing a fiber reinforced composite material according to a first version is a method of producing a fiber reinforced composite material by impregnating a fiber-reinforced base material (A) with a thermosetting resin (a) and further curing the thermosetting resin (a), the method including steps (II) to (IV):

step (II): feeding the fiber-reinforced base material (A) and a thermosetting resin base material (B) including the thermosetting resin (a) and a nonwoven fabric-shaped base material to a molding mechanism;

step (III): supplying the thermosetting resin (a) from the thermosetting resin base material (B) to the fiber-reinforced base material (A) by pressurization with the molding mechanism to impregnate the fiber-reinforced base material (A) with the thermosetting resin (a); and step (IV): curing the thermosetting resin (a) by heating with the molding mechanism.

The thermosetting resin (a) supplied to the fiber-reinforced base material (A) and the thermosetting resin (a) remaining in the thermosetting resin base material (B) are cured in the molding step (step (IV)) to serve as a matrix resin of the fiber reinforced composite material.

Fiber-Reinforced Base Material (A)

The fiber-reinforced base material (A) is not particularly limited as long as it is a base material including a reinforced fiber, but it is preferably at least one base material selected from a textile base material, a unidirectional base material, and a mat base material. Specific examples of a preferably used fiber-reinforced base material include a reinforced fiber bundle alone, a product obtained by arranging reinforced fiber bundles in one direction and sewing the bundles together using a stitching yarn, a textile base cloth made of a continuous fiber alone or a laminate of textile base cloths, a product obtained by sewing textile base cloths made of a continuous fiber together using a stitching yarn, fiber structures such as three-dimensional textiles and braids, and a discontinuous fiber formed into a nonwoven fabric. The term "continuous fibers" means reinforced fibers that are not cut into short fibers but are obtained by aligning reinforced fiber bundles in a continuous state.

In this aspect, the form and arrangement of the reinforced fibers used in the fiber-reinforced base material (A) can be appropriately selected from the forms of continuous fibers such as long fibers aligned in one direction, textiles, and rovings.

Further, the fiber-reinforced base material (A) may contain other substances such as various additives as long as it includes a reinforced fiber and further has an unimpregnated part containing no resin in at least a part thereof. From the viewpoint of formativeness at the time of molding, however, the fiber-reinforced base material (A) preferably does not contain a resin, that is, the fiber-reinforced base material (A) is preferably in a dry state. That is, the fiber-reinforced base material (A) is preferably made only of a reinforced fiber.

For the purpose of obtaining a fiber reinforced composite material excellent in mechanical characteristics, it is preferable to use a textile base material or a unidirectional base material made of a continuous fiber as the fiber-reinforced base material (A). Alternatively, for the purpose of increasing the impregnation speed of the thermosetting resin (a) supplied from the thermosetting resin base material (B) and improving the productivity of the fiber reinforced composite material, it is preferable to use a mat base material made of a discontinuous fiber as the fiber-reinforced base material (A).

The type of the reinforced fiber is not particularly limited, and a glass fiber, an aramid fiber, a metal fiber and the like are suitably used. A carbon fiber is more preferable. The carbon fiber is not particularly limited. For example, carbon fibers such as polyacrylonitrile (PAN)-based, pitch-based, and rayon-based carbon fibers can be preferably used from the viewpoint of improvement in mechanical characteristics and the effect of reducing the weight of the fiber reinforced composite material. These carbon fibers may be used alone or in combination of two or more thereof. Among the carbon fibers, PAN-based carbon fibers are more preferable from the viewpoint of the balance between the strength and elastic modulus of the obtained fiber reinforced composite material. The strand strength of the reinforced fiber is preferably 3.0 GPa or more, more preferably 4.0 GPa or more, still more preferably 4.5 GPa or more. The strand elastic modulus of the reinforced fiber is preferably 200 GPa or more, more preferably 220 GPa or more, still more preferably 240 GPa or more. Use of a reinforced fiber having a strand strength and a strand elastic modulus within the preferable ranges makes it possible to further improve the mechanical characteristics of the obtained fiber reinforced composite material.

Thermosetting Resin Base Material (B)

The thermosetting resin base material (B) is a base material including the thermosetting resin (a) and a nonwoven fabric-shaped base material. That is, the thermosetting resin base material (B) is a base material in which the thermosetting resin (a) is supported on the nonwoven fabric-shaped base material. The thermosetting resin base material (B) may contain other substances such as various additives as long as it includes the thermosetting resin (a) and the nonwoven fabric-shaped base material.

The form of the thermosetting resin base material (B) is preferably a sheet shape. The thickness of the thermosetting resin base material (B) is preferably 0.5 mm or more, more preferably 1 mm or more, still more preferably 1.5 mm or more from the viewpoint of resin supply properties and mechanical characteristics. Further, the thickness of the thermosetting resin base material (B) is preferably 100 mm or less, more preferably 60 mm or less, still more preferably 30 mm or less from the viewpoint of handleability and moldability.

The mass content Wb1 of the nonwoven fabric-shaped base material in the thermosetting resin base material (B) is preferably 0.5% (mass basis) or more, more preferably 1.0% (mass basis) or more, still more preferably 1.5% (mass basis) or more from the viewpoint of handleability. Further, the mass content Wb1 is preferably 30% (mass basis) or less, more preferably 22% (mass basis) or less, still more preferably 15% (mass basis) or less from the viewpoint of resin supply properties. When the mass content Wb1 of the nonwoven fabric-shaped base material in the thermosetting resin base material (B) is 0.5% (mass basis) or more and 30% (mass basis) or less, both the handleability at room temperature and resin supply properties at the time of molding can be achieved.

The mass content Wb1 of the nonwoven fabric-shaped base material in the thermosetting resin base material (B) is determined by the following formula:

$$Wb1 = W11/(W11+W12) \times 100 (\%)$$

W11: mass (g) of nonwoven fabric-shaped base material in thermosetting resin base material (B)
W12: mass (g) of thermosetting resin in thermosetting resin base material (B).

The mass content Wb1 of the nonwoven fabric-shaped base material in the thermosetting resin base material (B) can be determined from the mass difference before and after only the thermosetting resin (a) is removed from the sample cut out under the conditions described later. Examples of a method of removing only the thermosetting resin (a) from the thermosetting resin base material (B) include a method of placing the thermosetting resin base material (B) under heating conditions to bake off the thermosetting resin (a), and a method of immersing the thermosetting resin base material (B) in a solvent that dissolves the thermosetting resin (a) but does not dissolve the nonwoven fabric-shaped base material.

As for a method of cutting out the thermosetting resin base material (B), when the thermosetting resin (a) is solid at room temperature, the thermosetting resin base material (B) is cut out with care to not crush the thermosetting resin (a), whereas when the thermosetting resin (a) is liquid at room temperature, the thermosetting resin base material (B) is cut out under freezing conditions. An example of the freezing conditions is an atmosphere of a temperature lower by 10° C. or more than the melting point of the thermosetting resin (a) that is obtained by differential scanning calorimetry (DSC). If the melting point cannot be detected, a method of obtaining such temperature using the glass transition point instead can be mentioned.

The volume content Vb1 of the nonwoven fabric-shaped base material in the thermosetting resin base material (B) in this aspect is preferably 0.3% (volume basis) or more, more preferably 0.6% (volume basis) or more, still more preferably 1.0% (volume basis) or more from the viewpoint of handleability. Further, the volume content Vb1 is preferably 20% (volume basis) or less, more preferably 15% (volume basis) or less, still more preferably 10% (volume basis) or less from the viewpoint of resin supply properties. When the volume content Vb1 of the nonwoven fabric-shaped base material in the thermosetting resin base material (B) is 0.3% (volume basis) or more and 20% (volume basis) or less, both the handleability at room temperature and resin supply properties at the time of molding can be achieved.

The volume content Vb1 of the nonwoven fabric-shaped base material in the thermosetting resin base material (B) is determined by the following formula:

$$Vb1 = Faw1/(\rho 1 \times Tb1 \times 10)(\%)$$

Faw1: basis weight of nonwoven fabric-shaped base material (g/m$^2$)
$\rho 1$: density of constituent material of nonwoven fabric-shaped base material (g/cm$^3$)
Tb1: thickness of thermosetting resin base material (B) (mm).

As for a method of cutting out the thermosetting resin base material (B), when the thermosetting resin (a) is solid at room temperature, the thermosetting resin base material (B) is cut out with care to not crush the thermosetting resin (a), whereas when the thermosetting resin (a) is liquid at room temperature, the thermosetting resin base material (B) is cut out under freezing conditions. An example of the freezing conditions is an atmosphere of a temperature lower by 10° C. or more than the melting point of the thermosetting resin (a) obtained by differential scanning calorimetry (DSC). If the melting point cannot be detected, a method of obtaining such temperature using the glass transition point instead can be mentioned.

Further, the volume content Vb1 of the nonwoven fabric-shaped base material can be determined by the above-mentioned formula using the thickness Tb1 (unit: mm), the basis weight Faw1 (unit: g/m$^2$) of the nonwoven fabric-shaped base material, and the density $\rho 1$ (unit: g/cm$^3$) of the constituent material of the nonwoven fabric-shaped base material. The thickness Tb1 can be obtained using a microscope from the average of thicknesses of the thermosetting resin base material (B) at arbitrary 10 points within the range of 50 mm in length and 50 mm in width.

Thermosetting Resin (a)

The thermosetting resin (a) is not particularly limited as long as it is a resin having thermosetting properties, and is preferably at least one thermosetting resin selected from an epoxy resin, a vinyl ester resin, a phenol resin, a thermosetting polyimide resin, a polyurethane resin, a urea resin, a melamine resin, and a bismaleimide resin. Among these thermosetting resins, an epoxy resin is particularly preferable as the thermosetting resin (a) from the viewpoint of the balance between the temporal stability of the thermosetting resin base material (B) and the mechanical characteristics of the obtained fiber reinforced composite material. Besides use of an epoxy resin alone, a copolymer with a thermosetting resin containing an epoxy resin as a main component, a modified product of an epoxy resin, and a thermosetting resin that is a blend of two or more epoxy resins can also be used.

It is preferable that the thermosetting resin (a) in this aspect exhibit characteristics that it has a viscosity of 1,000 Pa·s or more at 40° C., and has a minimum viscosity of 10 Pa·s or less during heating from 30° C. at a temperature rise rate of 1.5° C./min. The thermosetting resin (a) having a viscosity of 1,000 Pa·s or more at 40° C. and a minimum viscosity of 10 Pa·s or less during heating from 30° C. at a temperature rise rate of 1.5° C./min achieves both the handleability at the time of feeding of the thermosetting resin base material (B) to the molding mechanism and the impregnating property of the thermosetting resin (a) into the fiber-reinforced base material (A) in the production of the fiber reinforced composite material by pressurization and heating in the molding mechanism.

The viscosity of the thermosetting resin (a) at 40° C. is preferably 1,000 Pa·s or more from the viewpoint of handleability, and is preferably 10 kPa·s or less from the viewpoint of processability of the thermosetting resin (a) in the preparation of the thermosetting resin base material (B). In addition, the minimum viscosity of the thermosetting resin (a) during heating from 30° C. at a temperature rise rate of 1.5° C./min is preferably 10 Pa·s or less from the viewpoint of the impregnating property into the fiber-reinforced base material (A) at the time of molding, and is preferably 1 mPa·s or more from the viewpoint of mechanical characteristics of a cured product of the thermosetting resin (a).

When the viscosity of the thermosetting resin (a) at 40° C. is 1,000 Pa·s or more, it is possible to prevent dripping away of the thermosetting resin (a) from the thermosetting resin base material (B) during feeding of the thermosetting resin (a) in the thermosetting resin base material (B) to the molding mechanism. The dripping of the thermosetting resin (a) from the thermosetting resin base material (B) not only contaminates the periphery of the molding mechanism but also disturbs the input of the fiber-reinforced base material (A) prepared in advance and the thermosetting resin base material (B) that are fed to the molding mechanism, making it difficult to produce a fiber reinforced composite material having a desired construction.

Meanwhile, when the minimum viscosity of the thermosetting resin (a) during heating from 30° C. at a temperature rise rate of 1.5° C./min is 10 Pa·s or less, the thermosetting resin (a) can be promptly supplied to the fiber-reinforced base material (A) and exhibits a good impregnating property in the production of the fiber reinforced composite material by feeding of the fiber-reinforced base material (A) and the thermosetting resin base material (B) to the molding mechanism, and heating and pressurization thereof. Improvement in the impregnating property suppresses generation of voids in the obtained fiber reinforced composite material as well as increases the degree of freedom in designing the production process.

Moreover, the thermosetting resin (a) in this aspect preferably has a cure index of 85% or more as measured by an ion viscometer after heated at 150° C. for 5 minutes. The cure index is an indicator of the degree of curing reaction of the thermosetting resin (a). The higher the cure index is, the easier the demolding of the obtained fiber reinforced composite material from the molding mechanism so that the time taken to heat and cure the thermosetting resin (a) to form a fiber reinforced composite material can be shortened. Therefore, the heating time in the process of producing the fiber reinforced composite material by feeding the thermosetting resin base material (B) and the fiber-reinforced base material (A) to the molding mechanism can be shortened, and the productivity can be improved. The cure index as measured by an ion viscometer after the thermosetting resin (a) is heated at 150° C. for 5 minutes is preferably 100% or less.

In this aspect, the viscosity of the thermosetting resin (a) in the thermosetting resin base material (B) at the preheating temperature and the molding temperature in the molding step described later is preferably 1,000 Pa·s or less, more preferably 100 Pa·s or less, still more preferably 10 Pa·s or less at either of the temperatures. When the viscosity of the thermosetting resin (a) in the thermosetting resin base material (B) at the preheating temperature and the molding temperature is 1,000 Pa·s or less, the thermosetting resin (a) is sufficiently impregnated into the fiber-reinforced base material (A), and generation of voids in the obtained fiber reinforced composite material can be suppressed.

Nonwoven Fabric-Shaped Base Material

The nonwoven fabric-shaped base material in this aspect is not particularly limited, but it is preferable that the nonwoven fabric-shaped base material be made of discontinuous fibers, and have a structure in which the discontinuous fibers are dispersed in a bundle shape or a short fiber shape, and voids to be impregnated with a thermosetting resin are provided between the fibers. Examples of discontinuous fibers suitable for the nonwoven fabric-shaped base material include organic fibers such as natural fibers and synthetic fibers, and inorganic fibers such as carbon fibers, glass fibers, and metal fibers. Among others, carbon fibers excellent in specific strength and specific elastic modulus are preferable as discontinuous fibers suitable for the nonwoven fabric-shaped base material. The form and shape of the nonwoven fabric-shaped base material are not limited. For example, the nonwoven fabric-shaped base material may be a base material that is a mixture of two or more types of fibers or a mixture with an organic compound or an inorganic compound, or a base material in which the fibers are sealed with other components or the fibers are bonded to a resin component. From the viewpoint of easily producing a structure in which fibers are dispersed, a preferable example of the shape of the nonwoven fabric-shaped base material is a base material in a nonwoven fabric form obtained by a dry method or a wet method, and in which the fibers are sufficiently opened and bonded to each other with a binder made of an organic compound.

Further, it is preferable that the nonwoven fabric-shaped base material in this aspect have a tensile strength $\sigma rt1$ at 40° C. of 0.5 MPa or more and a tensile strength ratio $\sigma r1$ described below of 0.5 or more to improve the handleability of the thermosetting resin base material (B).

The tensile strength $\sigma rt1$ of the nonwoven fabric-shaped base material at 40° C. is an indicator of mechanical characteristics of the nonwoven fabric-shaped base material under the evaluation according to the tensile strength measurement method defined in JIS-L1913 (2010) "General nonwoven fabric test method." Further, the "tensile strength ratio $\sigma r1$" as used herein is the ratio between the tensile strength $\sigma T1$ of the nonwoven fabric-shaped base material at the temperature T(° C.) described below and the tensile strength $\sigma rt1$ thereof at 40° C., and can be expressed by the following formula:

$$\sigma r1 = \sigma T1/\sigma rt1$$

$\sigma rt1$: tensile strength of nonwoven fabric-shaped base material at 40° C.

$\sigma T1$: tensile strength of nonwoven fabric-shaped base material at temperature T(° C.)

T: temperature at which thermosetting resin (a) exhibits minimum viscosity during heating from 30° C. at temperature rise rate of 1.5° C./min.

The temperature T is a temperature at which the viscosity of the thermosetting resin (a) is minimum value during heating from 30° C. at a temperature rise rate of 1.5° C./min. When there are a plurality of temperatures at which the viscosity of the thermosetting resin (a) is minimum value, the lowest temperature among them is defined as the temperature T.

The tensile strength $\sigma rt1$ of the nonwoven fabric-shaped base material in this aspect is preferably 0.5 MPa or more. The tensile strength $\sigma rt1$ is more preferably 1 MPa or more, still more preferably 3 MPa or more and 1,000 MPa or less from the viewpoint of preventing breakage of the nonwoven fabric-shaped base material by the tension or the own weight of the nonwoven fabric-shaped base material when the nonwoven fabric-shaped base material is conveyed with both ends thereof being gripped by a clamp. Use of such a nonwoven fabric-shaped base material makes it possible to apply high tension to the nonwoven fabric-shaped base material when the nonwoven fabric-shaped base material is gripped, and also to convey the nonwoven fabric-shaped base material without being cut during feeding of the thermosetting resin base material (B) to the molding mechanism so that the degree of freedom in the design of the molding mechanism can be increased.

Meanwhile, the tensile strength σT1 at the temperature T(° C.) represents the mechanical characteristics of the nonwoven fabric-shaped base material in the production of the fiber reinforced composite material by feeding the fiber-reinforced base material (A) and the thermosetting resin base material (B) to the molding mechanism, and pressurizing and heating the fiber-reinforced base material (A) and the thermosetting resin base material (B). The tensile strength ratio σr1 (=σT1/σrt1) that is the ratio between the strengths is preferably 0.5 or more, preferably 0.5 or more and 0.99 or less. The thermosetting resin base material (B) prepared using such a nonwoven fabric-shaped base material is good in handleability during the conveyance and lamination, and makes it possible to produce a fiber reinforced composite material without cutting and breakage of the nonwoven fabric-shaped base material when the thermosetting resin base material (B) is fed to the molding mechanism and pressurized and heated to give the fiber reinforced composite material so that the production process is stabilized.

The average fiber length of the fibers that constitute the nonwoven fabric-shaped base material is preferably 0.1 mm or more, more preferably 1 mm or more, still more preferably 2 mm or more. The average fiber length of the fibers is preferably 100 mm or less, more preferably 50 mm or less, still more preferably 10 mm or less.

Examples of a method of measuring the average fiber length include a method of directly extracting fibers from the nonwoven fabric-shaped base material, and a method of dissolving the thermosetting resin (a) in the thermosetting resin base material (B) using a solvent that dissolves only the thermosetting resin (a), and then separating the remaining fibers by filtration and observing them with a microscope (dissolution method). In the absence of a solvent that dissolves thermosetting resins, it is possible to employ a method of baking off only the thermosetting resin (a) in a temperature range in which the fibers are not oxidized to be reduced in weight, sorting the fibers, and measuring the fibers by microscope observation (bake off method). The average fiber length can be measured by randomly selecting 400 fibers, measuring the lengths thereof to 1 μm with an optical microscope, and calculating the fiber length and the ratio thereof. In a comparison between the method of directly extracting the fibers from the nonwoven fabric-shaped base material and the method of extracting the fibers by the bake off method or the dissolution method, no special difference is produced in the obtained result when the conditions are appropriately selected.

The X-Y plane of the nonwoven fabric-shaped base material (that is, the in-plane of a base material, wherein an axis orthogonal to a certain axis (X-axis) in-plane of the nonwoven fabric-shaped base material in this aspect is a Y-axis, and the thickness direction of the base material (that is, a direction perpendicular to the plane of the base material) is a Z-axis) preferably has an isotropic fiber orientation. The average of two-dimensional orientation angles of fibers in the X-Y plane, which is measured by the measurement method described later, is preferably 5° or more, more preferably 20° or more, still more preferably 30° or more. The closer the angle is to 45°, which is an ideal angle, the more preferable it is. When the average of two-dimensional orientation angles of fibers in the X-Y plane of the nonwoven fabric-shaped base material is 5° or more, the mechanical characteristics of the nonwoven fabric-shaped base material come closer to isotropic so that the lamination structure in feeding of the nonwoven fabric-shaped base material in the thermosetting resin base material (B) to the molding mechanism can be easily set.

To improve the supportability of the thermosetting resin base material (B) to support the thermosetting resin (a), the average of two-dimensional orientation angles of fibers in a plane orthogonal to the X-Y plane of the nonwoven fabric-shaped base material, which is measured by the measurement method described later, is preferably 5° or more, more preferably 10° or more, still more preferably 20° or more. The average of two-dimensional orientation angles of fibers in a plane orthogonal to the X-Y plane of the nonwoven fabric-shaped base material is preferably 85° or less, more preferably 80° or less, still more preferably 75° or less. When the average of two-dimensional orientation angles of fibers in a plane orthogonal to the X-Y plane of the nonwoven fabric-shaped base material is 5° or more and 85° or less, the supportability of the thermosetting resin (a) is improved so that the resin can be suitably supplied to the fiber-reinforced base material (A) during the molding.

The mass per unit area of the nonwoven fabric-shaped base material preferably used in this aspect is preferably 1 g/m² or more, more preferably 10 g/m² or more, still more preferably 30 g/m² or more. When the mass per unit area of the nonwoven fabric-shaped base material is 1 g/m² or more, the supportability of the thermosetting resin (a) and the handleability in the preparation of the thermosetting resin base material (B) are improved.

The fibers in the nonwoven fabric-shaped base material preferably used in this aspect are preferably bonded to each other with a binder. As a result, the handleability, productivity, and workability are improved, and the network structure of the nonwoven fabric-shaped base material can be maintained. The binder is not particularly limited. Examples of preferably used binders include thermoplastic resins such as polyvinyl alcohol, an ethylene-propylene copolymer, an ethylene-vinyl acetate copolymer, polyvinyl chloride, polyvinylidene chloride, polyvinyl acetate, a polycarbonate resin, a styrene resin, a polyamide resin, a polyester resin, a polyphenylene sulfide resin, a modified polyphenylene ether resin, a polyacetal resin, a polyether imide resin, a polypropylene resin, a polyethylene resin, a fluororesin, a thermoplastic acrylic resin, a thermoplastic polyester resin, a thermoplastic polyamideimide resin, an acrylonitrile-butadiene copolymer, a styrene-butadiene copolymer, and an acrylonitrile-styrene-butadiene copolymer, and thermosetting resins such as a urethane resin, a melamine resin, a urea resin, a thermosetting acrylic resin, a phenol resin, an epoxy resin, and a thermosetting polyester. From the viewpoint of mechanical characteristics of the obtained fiber reinforced composite material, a preferably used binder for the nonwoven fabric-shaped base material is a resin having at least one functional group selected from an epoxy group, a hydroxyl group, an acrylate group, a methacrylate group, an amide group, a carboxyl group, an acid anhydride group, an amino group, and an imine group. These binders may be used alone or in combination of two or more thereof. The deposition amount of the binder based on 100% by mass of the nonwoven fabric-shaped base material is preferably 0.01% by mass or more, more preferably 0.1% by mass or more, still more preferably 1% by mass or more from the viewpoint of form stability of the nonwoven fabric-shaped base material in relation to the handleability. Further, the deposition amount of the binder is preferably 20% by mass or less, more preferably 15% by mass or less, still more preferably 10% by mass or less from the viewpoint of productivity of the nonwoven fabric-shaped base material. When the deposition amount of the binder is 0.01% by mass or more and 20% by mass or less, a nonwoven fabric-shaped base material good in handleability can be efficiently produced.

Method of Deriving Average of Two-Dimensional Orientation Angles of Fibers in X-Y Plane The average of two-dimensional orientation angles of fibers in the X-Y plane is measured according to the following procedures I. and II. As described above, the X-axis, the Y-axis, and the Z-axis are orthogonal to one another, the X-Y plane is inside of the base material plane, and the Z-axis is in the thickness direction of the base material.

I. As for a monofilament in the nonwoven fabric-shaped base material randomly selected in the X-Y plane, the average of two-dimensional orientation angles between the selected monofilament and all monofilaments crossing the selected monofilament is measured. When there are a large number of monofilaments crossing the selected monofilament, it is also possible to use an average obtained by measuring randomly selected 20 monofilaments crossing the selected monofilament.

II. The measurement in I. is repeated five times in total about another monofilament, and the average thereof is calculated as the average of two-dimensional orientation angles of fibers.

The method of measuring the average of two-dimensional orientation angles of fibers of the nonwoven fabric-shaped base material from the thermosetting resin base material (B) is not particularly limited. An example of the method is a method of observing the fiber orientation from the surface of the thermosetting resin base material (B). In this case, it is preferable to polish the surface of the thermosetting resin base material (B) to expose the fibers because the fibers can be more easily observed. Another example of the method is a method of observing the fiber orientation using transmitted light passing through the thermosetting resin base material (B). In this case, it is preferable to thinly slice the thermosetting resin base material (B) because the fibers can be more easily observed. Still another example of the method is a method of photographing an image of fiber orientation by X-ray CT transmission observation of the thermosetting resin base material (B). In fibers with high radiolucency, it is preferable to mix fibers as a tracer into the fibers, or apply a drug as a tracer to the fibers because the fibers can be more easily observed.

Further, when it is difficult to measure the average of two-dimensional orientation angles of fibers by the above-mentioned method, it is also possible to employ a method of removing the thermosetting resin to not disturb the fiber structure and then observing the fiber orientation. For example, the average of two-dimensional orientation angles of fibers can be measured by sandwiching the thermosetting resin base material (B) between two stainless steel meshes, fixing the thermosetting resin base material (B) with screws or the like so that it may not move, then baking off the thermosetting resin component, and observing the obtained fiber base material with an optical microscope or an electron microscope.

Method of Deriving Average of Two-Dimensional Orientation Angles of Fibers in Plane Orthogonal to X-Y Plane The average of two-dimensional orientation angles of fibers in a plane orthogonal to the X-Y plane is measured according to procedures I and II.

I. The two-dimensional orientation angle of a monofilament randomly selected in a plane orthogonal to the X-Y plane is measured. When the monofilament is parallel to the Z-axis, the fiber two-dimensional orientation angle is 0°, and when the monofilament is perpendicular to the Z-axis, the fiber two-dimensional orientation angle is 90°. Therefore, the range of the fiber two-dimensional orientation angle is 0 to 90°.

II. The measurement in I. is performed on 50 monofilaments in total, and the average thereof is calculated as the average of two-dimensional orientation angles of fibers in the plane orthogonal to the X-Y plane.

The method of measuring the average of two-dimensional orientation angles of fibers from the thermosetting resin base material (B) is not particularly limited. An example of the method is a method of observing the fiber orientation from the Y-Z plane (Z-X plane) of the thermosetting resin base material (B). In this case, it is preferable to polish the cross section of the thermosetting resin base material (B) to expose the fibers because the fibers can be more easily observed. Another example of the method is a method of observing the fiber orientation using transmitted light passing through the thermosetting resin base material (B). In this case, it is preferable to thinly slice the thermosetting resin base material (B) because the fibers can be more easily observed. Still another example of the method is a method of photographing an image of fiber orientation by X-ray CT transmission observation of the thermosetting resin base material (B). In fibers with high radiolucency, it is preferable to mix fibers as a tracer into the fibers, or to apply a drug as a tracer to the fibers because the fibers can be more easily observed.

Further, when it is difficult to measure the average of two-dimensional orientation angles of fibers by the above-mentioned method, it is also possible to employ a method of removing the thermosetting resin to not disturb the fiber structure and then observing the fiber orientation. For example, the average of two-dimensional orientation angles of fibers can be measured by sandwiching the thermosetting resin base material (B) between two stainless steel meshes, fixing the thermosetting resin base material (B) with screws or the like so that it may not move, then baking off the thermosetting resin component, and observing the obtained fiber base material with an optical microscope or an electron microscope.

Production Method

The method of producing a fiber reinforced composite material according to the first version is a method of producing a fiber reinforced composite material by impregnating a fiber-reinforced base material (A) with a thermosetting resin (a) and further curing the thermosetting resin (a), the method including steps (II) to (IV) described later. In a more preferable aspect, the method includes step (I) described later. Hereinafter, the method of producing a fiber reinforced composite material according to the first version will be described.

Step (I)

The method of producing a fiber reinforced composite material according to the first version preferably includes, before step (II), step (I) of making the nonwoven fabric-shaped base material support the thermosetting resin (a) to prepare the thermosetting resin base material (B). Examples of the method of making the nonwoven fabric-shaped base material support the thermosetting resin (a) to prepare the thermosetting resin base material (B) include a method of forming the thermosetting resin (a) into a film shape conforming to a designated basis weight, applying the film to at least one surface of the nonwoven fabric-shaped base material, heating and pressurizing the resulting laminate at a temperature at which the curing reaction of the thermosetting resin (a) does not proceed to make the nonwoven fabric-shaped base material support the thermosetting resin (a), and winding up the resulting laminate. Further, when the viscosity of the thermosetting resin (a) is low and processing into a film shape is difficult, it is also possible to employ a method of making the nonwoven fabric-shaped base material support the thermosetting resin (a) by directly applying the thermosetting resin (a) to the nonwoven fabric-shaped base material or immersing the nonwoven fabric-shaped base material in the thermosetting resin (a).

Examples of a heating and pressurizing method of making the nonwoven fabric-shaped base material support the thermosetting resin (a) include methods using a multistage roll having a heat source such as a heater, a double belt press or the like. These methods have an advantage of providing an elongated thermosetting resin base material (B) because they are capable of continuously conveying the thermosetting resin (a) and the nonwoven fabric-shaped base material to the heating and pressurizing mechanism.

Another example of the preparation method is a method of preparing the thermosetting resin base material (B) by a division method. An example of the division method is a vacuum bag method of placing the nonwoven fabric-shaped base material cut into a predetermined size and the thermosetting resin (a) weighed in advance in a closed space, depressurizing the inside of the closed space, and heating the closed space for a predetermined time at a temperature at which the curing reaction of the thermosetting resin (a) does not proceed to replace the air present inside the nonwoven fabric-shaped base material with the thermosetting resin (a), thereby making the nonwoven fabric-shaped base material support the thermosetting resin (a).

When making the nonwoven fabric-shaped base material support the thermosetting resin (a) in step (I), it is preferable to heat the thermosetting resin (a) to a temperature at which the curing reaction of the thermosetting resin (a) does not proceed. The viscosity of the thermosetting resin (a) is reduced by heating, and an effect of promoting the permeation of the thermosetting resin (a) into the nonwoven fabric-shaped base material is exerted. The viscosity of the thermosetting resin (a) at a temperature at which the curing reaction does not proceed is preferably 1,000 Pa·s or less, more preferably 100 Pa·s or less, still more preferably 10 Pa·s or less. A viscosity of the thermosetting resin (a) at a temperature at which the curing reaction does not proceed of 1,000 Pa·s or less is preferable because the thermosetting resin (a) sufficiently permeates into the nonwoven fabric-shaped base material to reduce the unevenness in the resin content and thickness unevenness of the obtained thermosetting resin base material (B), and the fiber reinforced composite material produced using the thermosetting resin base material (B) is reduced in uneven supply of the thermosetting resin (a) to the fiber-reinforced base material (A), has few voids, and is high in quality.

In step (I), it is more preferable to pressurize the thermosetting resin (a) and the nonwoven fabric-shaped base material when making the nonwoven fabric-shaped base material support the thermosetting resin (a). The pressurization promotes the permeation of the thermosetting resin (a) into the nonwoven fabric-shaped base material. The pressure in the pressurization is preferably 0.1 MPa or more and 10 MPa or less. A pressure within the above-mentioned range is preferable because a sufficient effect of promoting the permeation owing to the pressurization can be obtained, and it is possible to make the thermosetting resin (a) efficiently permeate into the nonwoven fabric-shaped base material.

Step (II)

The method of producing a fiber reinforced composite material according to the first version includes step (II) of feeding the fiber-reinforced base material (A) and the thermosetting resin base material (B) including the thermosetting resin (a) and the nonwoven fabric-shaped base material to the molding mechanism. Examples of the form of feeding the fiber-reinforced base material (A) and the thermosetting resin base material (B) to the molding mechanism include, as a division method, a method of cutting the fiber-reinforced base material (A) and the thermosetting resin base material (B) into a desired shape and a desired size, laminating the cut fiber-reinforced base material (A) and thermosetting resin base material (B) into a preform, and then feeding the preform to the molding mechanism. The molding mechanism is not limited as long as it is a mechanism into which the preform is introduced and intended to impart a shape to the preform. Examples of the molding mechanism include a pressing machine having a pair of male and female double-sided dies and a shaping die having a shape on one surface.

In addition, it is preferable that the fiber-reinforced base material (A) and the thermosetting resin base material (B) be elongated, and the fiber-reinforced base material (A) and the thermosetting resin base material (B) be continuously fed to the molding mechanism. The elongated shape means that the length of the base material in the longitudinal direction is 10 m or more. An example of the method of continuously feeding the fiber-reinforced base material (A) and the thermosetting resin base material (B) include a method of subjecting the elongated fiber-reinforced base material (A) and the elongated thermosetting resin base material (B) to a step of sending out the fiber-reinforced base material (A) and the thermosetting resin base material (B) each placed on a creel and winding up the fiber-reinforced base material (A) and the thermosetting resin base material (B) with a winding mechanism such as a winder under tension, the method including use of the molding mechanism between the sending mechanism and the winding mechanism in the step. The above-mentioned method has an advantage that the fiber-reinforced base material (A) and the thermosetting resin base material (B) can be continuously fed to the molding mechanism. The molding mechanism is not particularly limited as long as it is a mechanism that imparts a shape, and examples of the mechanism include a mechanism capable of continuous molding such as a multistage roll and a double belt press.

Further, in step (II), the thermosetting resin base material (B) is fed to the molding mechanism with at least one side surface of the thermosetting resin base material (B) being sealed with the fiber-reinforced base material (A), whereby the flow of the thermosetting resin base material (B) is stopped, and the thermosetting resin (a) can be efficiently supplied to the fiber-reinforced base material (A). The side surface of the thermosetting resin base material (B) means a surface of the thermosetting resin base material (B) parallel to the thickness direction of the thermosetting resin base material (B). Depending on the shape of the obtained fiber reinforced composite material or the shape of the die, it is preferable to seal at least one side surface of the thermosetting resin base material (B), and it is more preferable to seal all the side surfaces thereof. The method of sealing the thermosetting resin base material (B) with the fiber-reinforced base material (A) is not particularly limited. Examples of the method include a method of wrapping a thermosetting resin base material (B) with a fiber-reinforced base material (A), and a method of sandwiching a thermosetting resin base material (B) with two fiber-reinforced base materials (A) and clamping the joint. Further, the fiber-reinforced base material (A) to seal the thermosetting resin base material (B) may be in close contact with the side surface of the thermosetting resin base material (B) or may form a space with the thermosetting resin base material (B).

Preheating Step

Further, the method of producing a fiber reinforced composite material according to the first version preferably includes a step of preliminarily heating (preheating) the thermosetting resin base material (B) before step (II). When the thermosetting resin base material (B) is preheated before being fed to the molding mechanism, since the thermosetting resin base material (B) is fed to the molding mechanism in a softened state, the thermosetting resin base material (B) is improved in shape followability as compared to when the thermosetting resin base material (B) is fed to the molding mechanism at room temperature.

The temperature in the preheating may be the same as or different from the temperature at which the thermosetting resin (a) is cured in step (IV) described later. When the preheating temperature is the same as the curing temperature, the preheating time is preferably within 10 minutes from the viewpoint of the viscosity increase of the thermosetting resin (a) caused by the curing reaction of the thermosetting resin (a).

In addition, from the viewpoint of resin flow and shape followability, the preheating temperature is preferably lower by 10° C. or more than the temperature at which the thermosetting resin (a) exhibits the minimum viscosity during heating at a temperature rise rate of 1.5° C./min. A preheating temperature lower by 10° C. or more than the temperature at which the thermosetting resin (a) exhibits the minimum viscosity during heating at a temperature rise rate of 1.5° C./min is preferable because the thermosetting resin base material (B) satisfactorily follows the desired shape to be improved in formativeness, and a fiber reinforced composite material having a complicated shape can be easily obtained.

Examples of the preheating method include a method of bringing the thermosetting resin base material (B) into direct contact with a hot plate equipped with a heater or the like, and an atmospheric heating method of heating the thermosetting resin base material (B) in a space temperature-controlled by hot air.

Step (III)

The method of producing a fiber reinforced composite material according to the first version includes step (III) of supplying the thermosetting resin (a) from the thermosetting resin base material (B) to the fiber-reinforced base material (A) by pressurization with the molding mechanism to impregnate the fiber-reinforced base material (A) with the thermosetting resin (a). Examples of the method of pressurization in step (III) include a continuous method and a division method.

An example of the continuous method is a method of pressurizing, with a multistage roll or a double belt press for pressurization, the fiber-reinforced base material (A) and the thermosetting resin base material (B) fed to the molding mechanism while conveying the fiber-reinforced base material (A) and the thermosetting resin base material (B) themselves.

An example of the division method is a method of forming a preform in advance from the fiber-reinforced base material (A) and the thermosetting resin base material (B), and then pressurizing the preform. Examples of the method of pressurization in the division method include a method of attaching double-sided dies to a pressing machine, and clamping the double-sided dies for pressurization, and a method of placing a preform including the fiber-reinforced base material (A) and the thermosetting resin base material (B) in a closed space formed of a one-sided shaping die and a flexible film, and depressurizing the closed space. In the latter case, since the closed space as a molding space has a pressure lower than that of the outside, the laminate (preform) of the fiber-reinforced base material (A) and the thermosetting resin base material (B) is brought into a pressurized state.

In step (III), the thermosetting resin base material (B) preferably has an in-plane elongation ratio that is represented by the following formula of 1.2 or less, more preferably 1.1 or less by the pressurization:

In-plane elongation ratio=(projected area after pressurization)/(projected area before pressurization).

The "projected area" is the projected area of the widest plane before the thermosetting resin base material (B) is fed to the molding mechanism in step (II), and generally increases by pressurization. The projected area after pressurization can be easily measured by decomposition or cross-sectional observation of the obtained fiber reinforced composite material. When the pressurizing force is controlled so that the thermosetting resin base material (B) would have an in-plane elongation ratio of 1.2 or less, the flow of the thermosetting resin base material (B) is suppressed, and the resin can be efficiently supplied to the fiber-reinforced base material (A). The lower limit of the in-plane elongation ratio is not particularly limited, but it is preferably 0.7 or more, more preferably 1.0 or more.

Step (IV)

The method of producing a fiber reinforced composite material according to the first version includes step (IV) of curing the thermosetting resin (a) by heating with the molding mechanism. The heating temperature can be set based on the curing rate of the thermosetting resin (a), and the time from the feeding of the fiber-reinforced base material (A) and the thermosetting resin base material (B) to the molding mechanism to the taking out of the same (molding time), and it is preferably 100° C. or higher and 300° C. or lower. Setting the heating temperature within the above-mentioned range is preferable because it is possible to shorten the molding cycle and to improve the productivity of the fiber reinforced composite material.

Simultaneous Progress of Step (III) and Step (IV)

It is preferable to simultaneously progress the pressurization in step (III) and the heating in step (IV). To simultaneously progress the pressurization in step (III) and the heating in step (IV) means that the time during which the pressurization in step (III) is performed and the time during which the heating in step (IV) is performed overlap each other, that is, there is a time during which both the operations are performed simultaneously. Therefore, the start time and the end time may be different between step (III) and step (IV). In other words, our methods include an aspect in which pressurization and heating are started simultaneously and ended simultaneously as well as an aspect in which pressurization is started and then heating is started, and then pressurization is ended and heating is finally ended, an aspect in which pressurization is started and then heating is started, and then heating is ended and pressurization is finally ended, and an aspect in which pressurization and heating are started simultaneously, and then pressurization is ended and heating is finally ended.

It is preferable that there be a time during which both the pressurization in step (III) and the heating in step (IV) are performed simultaneously, because it is possible to utilize both the shaping effect and the effect of promoting impregnation of the thermosetting resin (a) into the fiber-reinforced base material (A), which are brought about by the pressurization in step (III), and the effect of improving the shape followability of the thermosetting resin base material (B) due to softening and the effect of improving the impregnating property of the thermosetting resin (a) into the reinforced fiber due to a decrease in the viscosity of the thermosetting resin (a), which are brought about by the heating in step (IV).

Press Molding Using Double-Sided Dies

Figure 2:
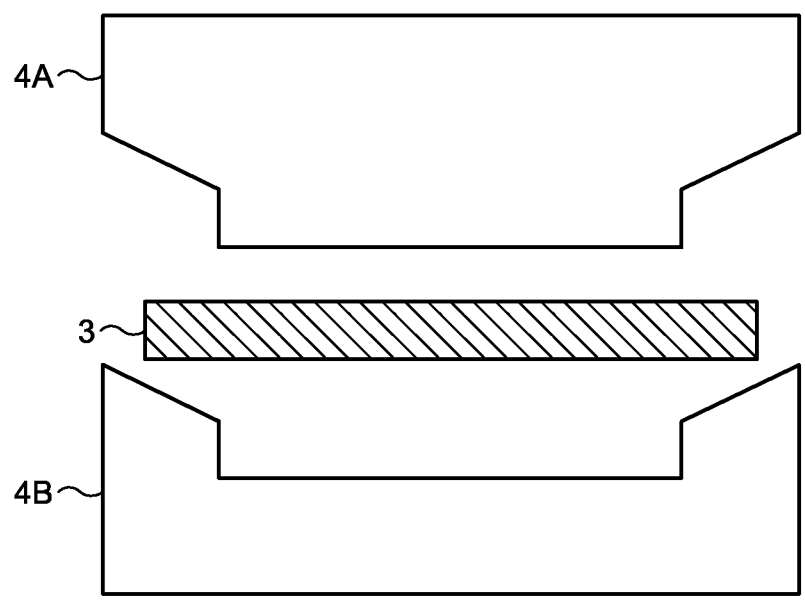
FIG. 2 is a schematic view showing a cross section in one example of a method of producing a fiber reinforced composite material using double-sided dies.

The method of producing a fiber reinforced composite material according to the first version is preferably a method in which the molding mechanism has a pair of double-sided dies, and a preform including the fiber-reinforced base material (A) and the thermosetting resin base material (B) is molded in the double-sided dies (referred to as a "press molding method") (FIG. 2). In an example of such a molding method, a preform 3 including a fiber-reinforced base material (A) and a thermosetting resin base material (B) is produced in advance and placed in dies (double-sided dies 4A and 4B), the preform is pressurized and shaped by clamping with the double-sided dies, and a thermosetting resin (a) is supplied to the fiber-reinforced base material (A) and impregnated into the fiber-reinforced base material (A). Then, the dies are heated to cure the thermosetting resin (a). The dies may be heated to the molding temperature before the preform 3 is placed, or may be heated to the molding temperature after the dies heated to the temperature at which the preform 3 softens are pressurized. The former method has an effect of shortening the molding cycle because it does not require cooling and heating of the dies, whereas the latter method has an effect of improving the surface quality of the obtained fiber reinforced composite material because it improves the shape followability.

It is more preferable to preheat the preform 3 before being placed in the double-sided dies (before step (II)) to soften the thermosetting resin base material (B) because the shape followability is improved.

Figure 3:
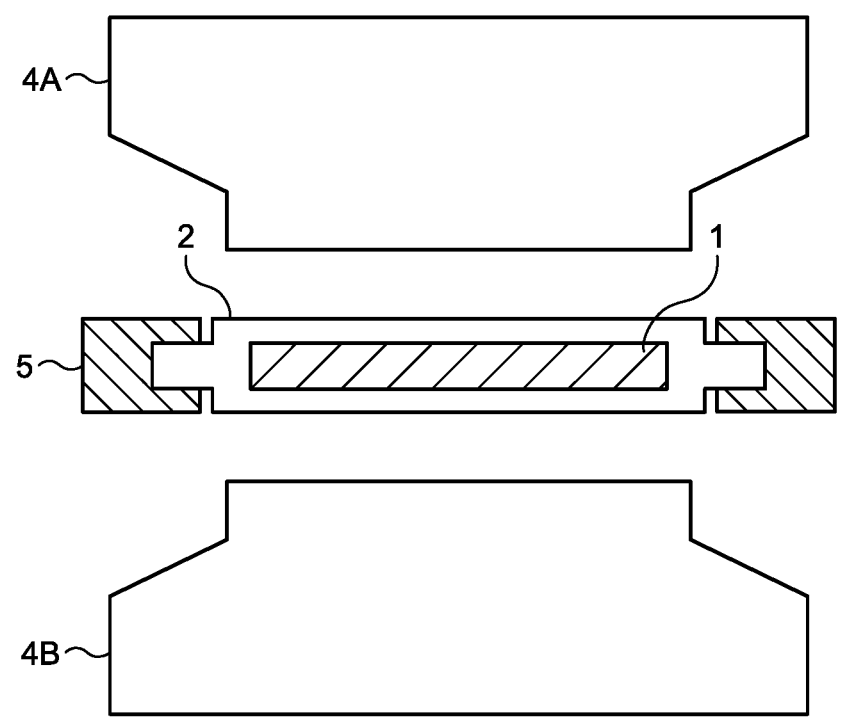
FIG. 3 is a schematic view showing a cross section in one example of the method of producing a fiber reinforced composite material using double-sided dies and a blank holder.

In placing the preform 3 on the double-sided dies, it is preferable to use a blank holder 5 to hold the preform 3 (FIG. 3). Since the blank holder 5 can fix the ends of the preform 3 by sandwiching the ends of the preform 3, the side leakage of the thermosetting resin (a) discharged from a thermosetting resin base material 1 can be prevented, and a fiber-reinforced base material 2 can be impregnated with the thermosetting resin (a) without waste. The blank holder also has an advantage that it can assist setting of the preform 3 into the dies and taking out of the preform 3 from the dies.

Moreover, in step (III), it is preferable that clamping be started at a surface pressure P1 (MPa), and completed at a surface pressure P2 (MPa) higher than the surface pressure P1. The surface pressure P2 is more preferably twice or more the surface pressure P1, and is still more preferably three times or more the surface pressure P1. That is, it is possible to achieve both the molding in a complicated shape and stable impregnation of the resin by preferentially shaping the preform at a lower pressure since the viscosity of the resin is high at the start of clamping, and supplying the resin at a higher pressure to the shaped preform at the completion of clamping. In this aspect, as long as the relationship between the surface pressure P1 at the start of clamping and the surface pressure P2 at completion of clamping satisfies the condition: P2>P1, the value of surface pressures in the middle of clamping and the magnitude relationship between the surface pressures are not particularly limited. However, it is preferable to employ a method of holding the preform at the surface pressure P1 at the start of clamping to shape the preform, and then increasing the pressure up to the surface pressure P2 at the completion of clamping.

Molding with Single-Sided Die and Cover Film

Figure 4:
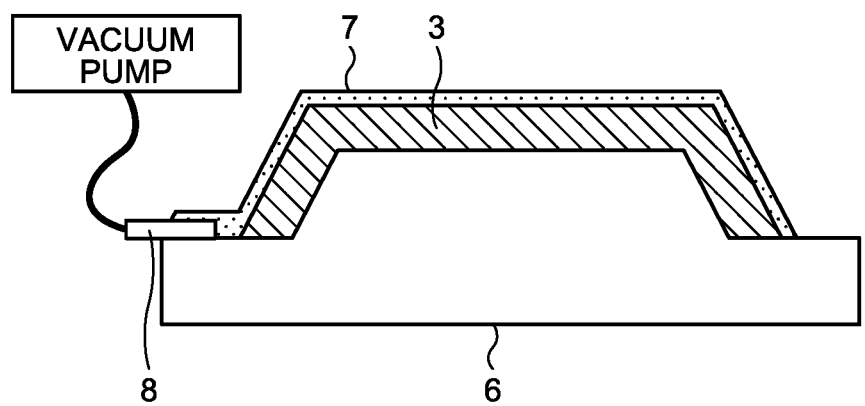
FIG. 4 is a schematic view showing a cross section in one example of the method of producing a fiber reinforced composite material using a single-sided die and a cover film.

In the method of producing a fiber reinforced composite material according to the first version, it is preferable that the molding mechanism have a single-sided die 6, and a preform 3 including the fiber-reinforced base material (A) and the thermosetting resin base material (B) be placed in the single-sided die 6, further packed with a cover film 7, and molded (FIG. 4). In an example of such a molding method, the preform 3 including the fiber-reinforced base material (A) and the thermosetting resin base material (B) is produced, and placed in the single-sided die 6. The preform 3 is placed between the cover film 7 and the single-sided die 6, and an end of the cover film 7 having a size larger than that of the preform 3 is brought into close contact with the single-sided die using a sealing material. A suction port 8 is provided in a part of the close contact surface between the cover film 7 and the single-sided die 6, and the air present inside the molding space (a space formed by the single-sided die 6 on which the preform 3 is placed and the cover film 7) is sucked from the suction port 8 using a vacuum pump to depressurize the molding space. In this case, since the molding space has a lower pressure than in the outside, the preform 3 is in a pressurized state. Then, the preform is put in a hot air oven or the like and heated, whereby the thermosetting resin (a) is melted and impregnated into the fiber-reinforced base material (A), and the curing reaction proceeds to give a fiber reinforced composite material. In this molding method, since the gas present inside the molding space is sucked and the molding space is depressurized, the air contained in the fiber-reinforced base material (A) is also removed. Therefore, void formation in the obtained fiber reinforced composite material is suppressed, and an effect of imparting good mechanical characteristics and surface quality is exerted.

Depressurization by a vacuum pump may be stopped or continued at the time of heating, but the depressurization is preferably continued also during the heating from the viewpoint of suppressing the voids in the obtained fiber reinforced composite material. In addition, it is preferable to use a flexible film for the cover film 7 since such a film is good in followability to a single-sided die.

Molding with Hollow Die

In the method of producing a fiber reinforced composite material according to the first version, it is preferable that the molding mechanism has a hollow die, a preform including the fiber-reinforced base material (A) and the thermosetting resin base material (B) be placed in a hollow portion, and the hollow portion be pressurized. In an example of such a molding method, a preform including the fiber-reinforced base material (A) and the thermosetting resin base material (B) is produced, and placed to be applied to a molding surface in the hollow die. The hollow portion is pressurized to shape the preform and supply the thermosetting resin (a)

to the fiber-reinforced base material (A), and the inside of the hollow die is heated to cure the thermosetting resin (a). The hollow die may be heated to the molding temperature before the preform is placed, or may be heated to the molding temperature after the preform is placed in the hollow portion of the hollow die heated to the temperature at which the preform softens, and the hollow portion is pressurized. The former method has an effect of shortening the molding cycle because it does not require cooling and heating of the hollow die, whereas the latter method has an effect of improving the surface quality of the obtained fiber reinforced composite material because it improves the shape followability. Further, the hollow die may be of integrated type formed of one rigid body having a hollow portion, or may be of split type formed of a combination of a plurality of rigid bodies to constitute a hollow portion. Examples of a method of pressurizing the hollow portion include a method of allowing compressed air to flow into the hollow portion.

Molding with Core Die

Figure 5:
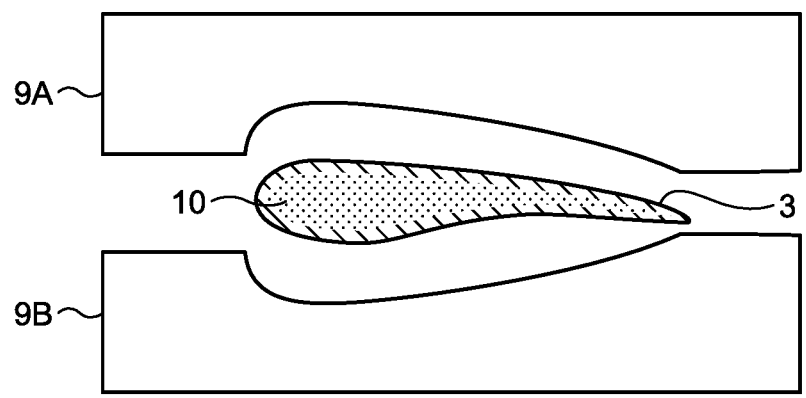
FIG. 5 is a schematic view showing a cross section in one example of the method of producing a fiber reinforced composite material using hollow dies and a core die.

More preferably, the molding mechanism further has a core die (FIG. 5). In such a molding method, the molding mechanism has a core die 10 in addition to the hollow dies (9A and 9B). It is allowable to place the preform 3 including the fiber-reinforced base material (A) and the thermosetting resin base material (B) in the hollow portion of the hollow dies (9A and 9B) and insert the core die 10 into the preform 3, or to insert, into the hollow portion formed by the hollow dies (9A and 9B), the core die 10 and the preform 3 placed on the surface of the core die 10. As a pressurizing method, a gas is preferably introduced into the core die 10 to inflate the core die 10. The core die 10 is preferably a thermoplastic resin bladder capable of uniformly applying a pressure even at high temperatures. Such a molding method has an effect of easily producing a fiber reinforced composite material having a hollow shape since the outer surface of the preform 3 is pressed against the dies.

Molding with Take-Up Mechanism

In the method of producing a fiber reinforced composite material according to the first version, it is preferable that the molding mechanism have a mechanism for taking up the fiber-reinforced base material (A) and the thermosetting resin base material (B) while pressurizing the fiber-reinforced base material (A) and the thermosetting resin base material (B). In an example of such a molding method, a fiber reinforced composite material having a constant cross section is continuously produced by continuously feeding a laminate 16 (see FIG. 1) including an elongated fiber-reinforced base material (A) and an elongated thermosetting resin base material (B) to a molding mechanism, pressurizing and shaping the laminate 16 to supply the thermosetting resin (a) to the fiber-reinforced base material (A), and heating the laminate 16 to cure the thermosetting resin (a) in the molding mechanism. From the viewpoint of a continuous molding cycle, it is preferable to simultaneously progress the pressurization in step (III) and the heating in step (IV) for molding. Such a molding method has an effect of easily producing an elongated fiber reinforced composite material having a constant cross section. The molding mechanism may be a through die having a through hole or a pressing die having a shaping surface on the surface of a rigid body. A mold having a heating mechanism such as a heater can simultaneously perform pressurization and heating.

Figure 6:
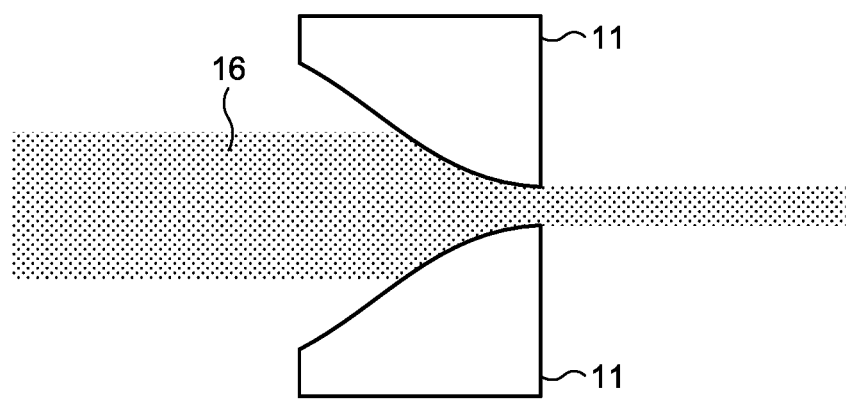
FIG. 6 is a schematic view showing a cross section in one example of the method of producing a fiber reinforced composite material using a through die (through pultrusion die).

An example of a through die 11 is, as shown in FIG. 6, a through die that is a rigid body having a through hole, that has on one surface thereof a supply port through which the laminate 16 including the fiber-reinforced base material (A) and the thermosetting resin base material (B) is to be supplied, and that has, on a surface opposite to the surface on which the supply port is provided, a pull-out port for pulling out the obtained fiber reinforced composite material. At the time of molding, the laminate 16 including the fiber-reinforced base material (A) and the thermosetting resin base material (B) is continuously fed from the supply port, passed through the through hole, and pulled out from the pull-out port so that the laminate 16 is pressurized and shaped in the through die 11, and the thermosetting resin (a) is supplied to the fiber-reinforced base material (A) and heated to be cured. A preferable shape of the through die 11 is a shape in which the supply port is larger than the pull-out port and the through hole is tapered, since such a shape facilitates the pressurization. Examples of heating of such a molding mechanism include, in addition to atmospheric heating of performing heating in a furnace, direct heating of performing heating with a heating mechanism such as a heater provided in the through die 11 itself.

Figure 7:
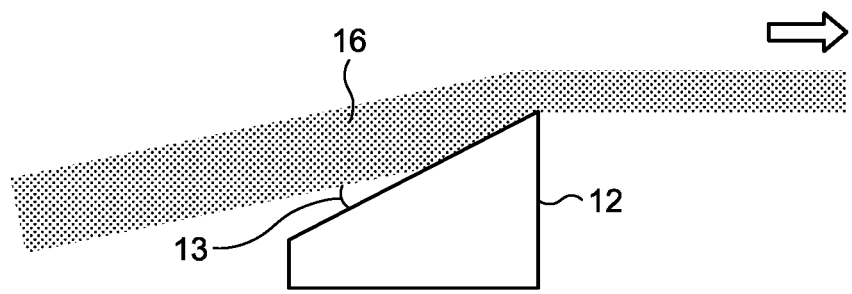
FIG. 7 is a schematic view showing a cross section in one example of the method of producing a fiber reinforced composite material using a pressing die (pressing pultrusion die).

Further, as a pressing die 12, it is preferable to use a die as shown in FIG. 7, which is made of a rigid body and has a pressing surface capable of uniformly pressurizing the laminate 16 including the fiber-reinforced base material (A) and the thermosetting resin base material (B) at the time of molding. At the time of molding, the laminate 16 including the fiber-reinforced base material (A) and the thermosetting resin base material (B) is continuously conveyed under tension, the laminate 16 is pressed against the molding surface of the pressing die 12 so that the laminate 16 is pressurized and shaped and the thermosetting resin (a) is supplied to the fiber-reinforced base material (A), and the laminate 16 is heated so that the thermosetting resin (a) is cured. As for the shape of the pressing die 12, the angle θ13 of contact between the surface of the die and the surface of the laminate 16 including the fiber-reinforced base material (A) and the thermosetting resin base material (B) fed to the die is preferably 15° to 45°, more preferably 25° to 40°. If the angle is small, sufficient pressure is not applied so that not only the supply of the thermosetting resin (a) to the fiber-reinforced base material (A) is insufficient but also the problem that the laminate cannot be molded into a desired shape may occur. On the other hand, if the angle θ13 is large, an excessive stress is applied so that the laminate 16 including the fiber-reinforced base material (A) and the thermosetting resin base material (B) may be cut during the molding. Examples of heating of such a molding mechanism include, in addition to atmospheric heating of performing heating in a furnace, direct heating of performing heating with a heating mechanism such as a heater provided in the pressing die 12 itself.

Figure 8:
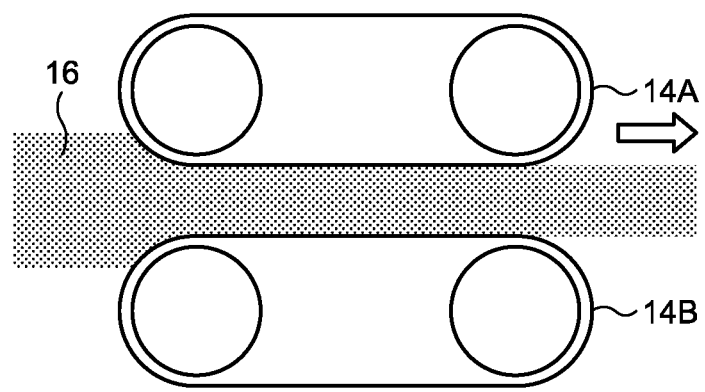
FIG. 8 is a schematic view showing a cross section in one example of the method of producing a fiber reinforced composite material using a double belt press.

Further, in the mechanism that takes up the fiber-reinforced base material (A) and the thermosetting resin base material (B) while pressurizing them, a double belt press (14A and 14B) can be suitably used as a pressurizing mechanism (FIG. 8). Employing such a pressurizing mechanism has an effect of improving the productivity of the fiber reinforced composite material because it facilitates continuous molding of a fiber reinforced composite material.

It is also preferable to use an intermittent press system having two or more molding mechanisms including a molding mechanism for heating and a molding mechanism for cooling arranged in parallel. Use of a press system in which the molding mechanism for heating and the molding mechanism for cooling are separated from each other is preferable because it eliminates the need for a step of raising and lowering the temperature in the molding mechanism so that the productivity of the fiber reinforced composite material can be improved.

Suitable Aspect of Fiber-Reinforced Base Material (A) and Thermosetting Resin Base Material (B) in Step (II)

Figure 9:
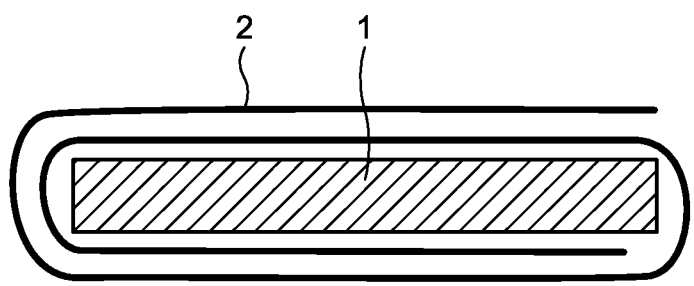
FIG. 9 is a schematic cross-sectional view of one example of an aspect in which the thermosetting resin base material used in the production method is covered with the fiber-reinforced base material.
Figure 10:
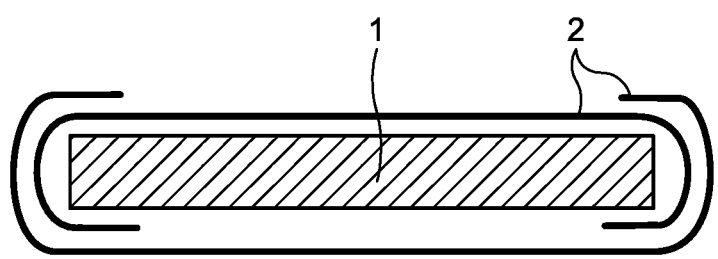
FIG. 10 is a schematic cross-sectional view of one example of an aspect in which the thermosetting resin base material used in the production method is covered with the fiber-reinforced base material.

In this aspect, in step (II), the thermosetting resin base material (B) is preferably covered with the fiber-reinforced base material (A). More preferably, the thermosetting resin base material (B) is completely covered with the fiber-reinforced base material (A), and the thermosetting resin base material (B) is not exposed at all. Such a form has an effect of preventing leakage of the thermosetting resin (a) discharged from the thermosetting resin base material (B) to the outside of the molding region, as well as an effect of supplying the resin to the fiber-reinforced base material (A) without waste. As shown in FIGS. 9 and 10, examples of the form of covering the thermosetting resin base material (B) with the fiber-reinforced base material (A) include a form in which a fiber-reinforced base material (A) is wound around a thermosetting resin base material (B) and a form in which a plurality of fiber-reinforced base materials (A) are put on a thermosetting resin base material (B).

In molding by the continuous method, the above-mentioned effects can be exerted when the cross section of the laminate including the fiber-reinforced base material (A) and the thermosetting resin base material (B) in a direction orthogonal to the direction in which the laminate is conveyed to the molding mechanism has the construction as shown in FIG. 9 or 10.

Meanwhile, in molding by the division method, the above-mentioned effects can be exerted when an arbitrary cross section of the preform has the construction as shown in FIG. 9 or 10.

In this aspect, it is preferable in step (II) that the fiber-reinforced base material (A) be fed to the molding mechanism in a state where the fiber-reinforced base material (A) is in contact with the molding mechanism, and at least a part of the thermosetting resin base material (B) be covered with the fiber-reinforced base material (A). It is preferable that the molding mechanism and the fiber-reinforced base material (A) are in contact with each other because friction with the molding mechanism is reduced, and the shape followability is improved. Examples of the method of feeding the fiber-reinforced base material (A) to the molding mechanism in a state where the fiber-reinforced base material (A) is in contact with the molding mechanism include, when the molding mechanism is a press mechanism that sandwiches the laminate between upper and lower dies, a method of placing the fiber-reinforced base material (A) on the lowermost surface or the uppermost surface of the molding mechanism.

In this aspect, it is preferable in step (II) that the fiber-reinforced base material (A) and the thermosetting resin base material (B) be fed to the molding mechanism in a state where the fiber-reinforced base material (A) is in direct contact with the thermosetting resin base material (B). When the fiber-reinforced base material (A) and the thermosetting resin base material (B) are fed to the molding mechanism in a state where the fiber-reinforced base material (A) is in direct contact with the thermosetting resin base material (B), in supplying the thermosetting resin (a) in step (III), surface injection of supplying the thermosetting resin (a) at the contact surface is realized. Therefore, the impregnating property is improved, and the molding cycle can be shortened.

As for a form of bringing the fiber-reinforced base material (A) and the thermosetting resin base material (B) into direct contact with each other, each one layer of the fiber-reinforced base material (A) and the thermosetting resin base material (B) may be laminated, or a plurality of layers of the fiber-reinforced base materials (A) and the thermosetting resin base materials (B) may be laminated.

Figure 11:
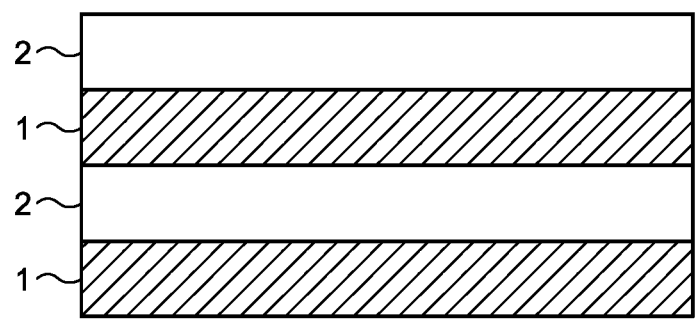
FIG. 11 is a schematic cross-sectional view of one example of an alternate laminate used in the production method, which includes four or more layers in total of the fiber-reinforced base materials and the thermosetting resin base materials.

In this aspect, it is preferable in step (II) that a laminate of a total of four or more layers of the fiber-reinforced base materials (A) and the thermosetting resin base materials (B) be fed to the molding mechanism. Above all, it is preferable to alternately laminate four or more layers in total of the fiber-reinforced base materials (A) and the thermosetting resin base materials (B) (FIG. 11) from the viewpoint of the impregnating property of the thermosetting resin (a), and this form has an effect of improving the freedom of design of the thickness of the fiber reinforced composite material. The upper limit of the number of laminated layers is not particularly limited, but the number of laminated layers is preferably 100 or less from the viewpoint of the quality of the obtained fiber reinforced composite material. Feeding the fiber-reinforced base materials (A) and the thermosetting resin base materials (B) in such a form to the molding mechanism is preferable because a good-quality fiber reinforced composite material having an arbitrary thickness can be produced.

Figure 12:
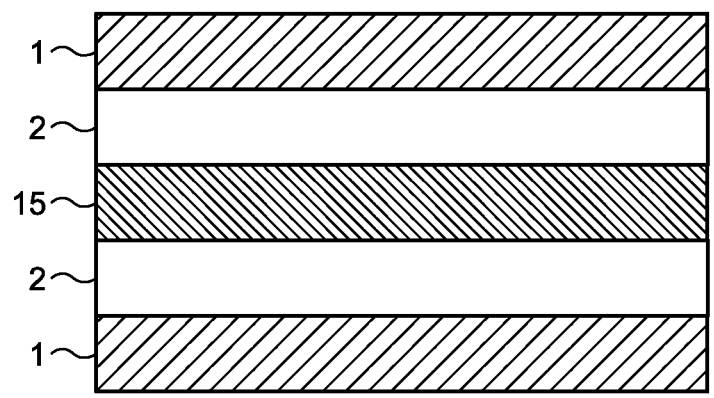
FIG. 12 is a schematic cross-sectional view of one example of a laminate used in the production method, which includes the fiber-reinforced base materials, the thermosetting resin base materials, and a core material laminated on one another.

In this aspect, it is preferable in step (II) that a core material (C) (core material 15) be further fed to the molding mechanism in addition to the fiber-reinforced base material (A) and the thermosetting resin base material (B). When the fiber-reinforced base material (A), the thermosetting resin base material (B), and the core material (C) are fed to the molding mechanism in such a construction, it is easy to control the increase in thickness, improvement in rigidity, weight reduction and the like of the obtained fiber reinforced composite material (FIG. 12).

Preferably, the fiber-reinforced base material (A) is laminated on the surface of the core material (C) so that the core material (C) and the thermosetting resin base material (B) do not come into direct contact with each other. With such a construction, impregnation of the thermosetting resin (a) into the core material (C) is suppressed, and a lightweight and high-quality fiber reinforced composite material can be obtained.

The core material (C) is suitably a foamed foam. A foamed foam suitable as the core material (C) may be a foamed foam having closed cells or a foamed foam having open cells, but a foamed foam having closed cells is preferable from the viewpoint of suppressing the impregnation of the thermosetting resin (a) into the foamed foam. Examples of the foamed foam include, besides rigid urethane foams and hard acrylic foams, foam materials obtained by coating a network structure formed by raising the surface of reinforced fibers with a resin.

EXAMPLES

In the following, examples will be shown to describe this aspect more specifically.

Materials Used

Thermosetting Resin (a-1)

In a kneader, 30 parts by mass of "jER (registered trademark)" 828 (manufactured by Mitsubishi Chemical Corporation), 35 parts by mass of "jER (registered trademark)" 1001, and 35 parts by mass of "jER (registered trademark)" 154 were charged, heated to 150° C. while being kneaded, and then kneaded at 150° C. for 1 hour to give a transparent viscous liquid. The viscous liquid was cooled to 60° C. while being kneaded, then 3.7 parts by mass of DYCY7 (manufactured by Mitsubishi Chemical Corporation) as a curing agent, 3 parts by mass of DCMU99 (manufactured by Hodogaya Chemical Co., Ltd.) as a curing accelerator, and 3 parts by mass of "Matsumoto Microsphere (registered trademark)" M (manufactured by Matsumoto Yushi-Seiyaku Co., Ltd.) as particles were blended, and the blend was kneaded at 60° C. for 30 minutes to prepare a thermosetting resin composition. The thermosetting resin composition was applied to release paper using a film coater to produce films of a thermosetting resin (a-1) each having a mass per unit area of 50 g/m$^2$ or 100 g/m$^2$.

Further, one layer of the thermosetting resin (a-1) having a mass per unit area of 50 g/m$^2$ and seven layers of the thermosetting resin (a-1) each having a mass per unit area of 100 g/m$^2$ were laminated to form a total of eight layers of the thermosetting resin (a-1) collectively having a mass per unit area of 750 g/m$^2$.

Nonwoven Fabric-Shaped Base Material

A nonwoven fabric-shaped base material made of reinforced fibers was prepared according to the following procedure.

Procedure 1: A copolymer containing PAN as a main component was subjected to spinning, firing treatment, and surface treatment to give continuous carbon fibers having a total number of monofilaments of 12,000. Characteristics of the continuous carbon fibers were as follows:

Monofilament diameter: 7 μm
Mass per unit length: 0.8 g/m
Density: 1.8 g/cm$^3$
Tensile strength: 4600 MPa
Tensile elastic modulus: 220 GPa.

Procedure 2: The continuous carbon fibers obtained in Procedure 1 were cut with a cartridge cutter into a length of 6 mm to give chopped fibers. A dispersion liquid containing water and a surfactant (Polyoxyethylene Lauryl Ether (trade name) manufactured by NACALAI TESQUE, INC.) was produced, and a papermaking base material was produced using the dispersion liquid and the chopped fibers in a production device for papermaking base materials. In the papermaking, the mass per unit area was adjusted by adjusting the fiber concentration in the dispersion liquid. About 5% by mass of an aqueous polyvinyl alcohol solution (Kuraray Poval manufactured by KURARAY CO., LTD.) as a binder was adhered to the papermaking base material, and the base material was dried in a drying oven at 140° C. for 1 hour to give a nonwoven fabric-shaped base material having a mass per unit area of 100 g/m$^2$.

Fiber-Reinforced Base Material (A-1)

"Torayca" cloth, CO6343B (plain weave, fiber basis weight: 198 g/m$^2$) manufactured by Toray Industries, Inc. was used as a fiber-reinforced base material (A-1).

Thermosetting Resin Base Material (B-1)

The nonwoven fabric-shaped base material and the thermosetting resin (a-1) having a mass per unit area of 750 g/m$^2$ were laminated to have a structure of thermosetting resin (a-1)/nonwoven fabric-shaped base material/thermosetting resin (a-1), and heated in a pressing machine temperature-controlled to 70° C. under pressurization with a surface pressure of 0.1 MPa for 1.5 hours to produce a thermosetting resin base material (B-1). In the thermosetting resin base material (B-1), the mass content Wb1 of the nonwoven fabric-shaped base material was 6.3% (mass basis), and the volume content Vb1 thereof was 4.3% (volume basis).

Example 1

Two layers of the fiber-reinforced base materials (A-1) were laminated on each of the front and back of the thermosetting resin base material (B-1), that is, the fiber-reinforced base materials (A-1) and the thermosetting resin base material (B-1) were laminated to have a structure of fiber-reinforced base material (A-1)/fiber-reinforced base material (A-1)/thermosetting resin base material (B-1)/fiber-reinforced base material (A-1)/fiber-reinforced base material (A-1) to produce a laminate. The laminate was placed in double-sided dies attached to a pressing machine, and the double-sided dies were clamped and a surface pressure of 1 MPa was applied. The heating plate provided in the pressing machine was temperature-controlled, and the double-sided dies were heated from room temperature (25° C.) to 150° C. at a temperature rise rate of 1.5° C./min and held for 10 minutes after reaching 150° C. to produce a fiber reinforced composite material. After 10 minutes of the holding, the pressure on the double-sided dies was released, and a fiber reinforced composite material (1) was demolded.

The surface quality of the fiber reinforced composite material (1) was good. As a result of cross-sectional observation, no voids were observed in layers including the fiber-reinforced base material (A-1) and the thermosetting resin (a-1). In this example, the presence or absence of voids was judged by the presence or absence of voids having a diameter of 5 μm or more in a microscope observation image. The in-plane elongation ratio of the thermosetting resin base material (B) was 1.10.

Example 2

Two layers of the fiber-reinforced base materials (A-1) were laminated on each of the front and back of the thermosetting resin base material (B-1), that is, the fiber-reinforced base materials (A-1) and the thermosetting resin base material (B-1) were laminated to have a structure of fiber-reinforced base material (A-1)/fiber-reinforced base material (A-1)/thermosetting resin base material (B-1)/fiber-reinforced base material (A-1)/fiber-reinforced base material (A-1) to produce a laminate. Double-sided dies partially having an uneven shape in the molding surface were attached to a pressing machine, and the heating plate provided in the pressing machine was temperature-controlled to temperature-control the double-sided dies to 70° C. The laminate was placed in the double-sided dies temperature-controlled to 70° C., and the double-sided dies were clamped and the laminate was preheated for 10 minutes at a zero surface pressure. After 10 minutes, the double-sided dies were raised and lowered to apply a surface pressure of 1 MPa, and the double-sided dies were heated to 150° C. at a temperature rise rate of 1.5° C./min and held for 10 minutes after reaching 150° C. to produce a fiber reinforced composite material. After 10 minutes of the holding, the pressure on the double-sided dies was released, and a fiber reinforced composite material (2) was demolded.

The surface quality of the fiber reinforced composite material (2) was good, and the fiber reinforced composite material (2) had a shape following the uneven shape of the double-sided dies. As a result of cross-sectional observation, no voids were observed in layers including the fiber-reinforced base material (A-1) and the thermosetting resin (a-1). In this example, the presence or absence of voids was judged by the presence or absence of voids having a diameter of 5 μm or more in a microscope observation image. The in-plane elongation ratio of the thermosetting resin base material (B) was 1.05.

Example 3

Two layers of the fiber-reinforced base materials (A-1) were laminated on each of the front and back of the thermosetting resin base material (B-1), that is, the fiber-reinforced base materials (A-1) and the thermosetting resin base material (B-1) were laminated to have a structure of fiber-reinforced base material (A-1)/fiber-reinforced base material (A-1)/thermosetting resin base material (B-1)/fiber-reinforced base material (A-1)/fiber-reinforced base material (A-1) to produce a laminate. The laminate was placed in a single-sided die, the periphery of the single-sided die was covered with a sealing material (a cover film and the die were brought into close contact with each other, and the inside of the die was sealed), and then a bleeder (that plays a role of a spacer as a passage of air and resin) made of a thick nonwoven fabric was placed on the outer periphery of the laminate. A tube as a suction port was provided on the bleeder, and the sealing material and the cover film were brought into close contact with each other so that the cover film would cover the single-sided die. For the cover film, a flexible cover film was used. A vacuum pump was connected to the tube as a suction port, and the air inside the molding space (a space including the laminate formed of the single-sided die and the cover film) was sucked to depressurize the molding space, whereby the laminate was pressurized. Then, the single-sided die was placed in an oven temperature-controlled to 150° C. and held for 30 minutes to produce a fiber reinforced composite material. After 30 minutes of the holding, the single-sided die was taken out, and a fiber reinforced composite material (3) was demolded.

The surface quality of the fiber reinforced composite material (3) was good. As a result of observation of the surface with a microscope, no voids were observed. In addition, as a result of cross-sectional observation, no voids were observed in layers including the fiber-reinforced base material (A-1) and the thermosetting resin (a-1). In this example, the presence or absence of voids was judged by the presence or absence of voids having a diameter of 5 µm or more in a microscope observation image. The in-plane elongation ratio of the thermosetting resin base material (B) was 1.01.

Example 4

A polypropylene bladder was prepared as a hollow core die, and base materials were laminated on the whole outer periphery of the bladder to have a structure of (bladder)/fiber-reinforced base material (A-1)/fiber-reinforced base material (A-1)/thermosetting resin base material (B-1)/fiber-reinforced base material (A-1)/fiber-reinforced base material (A-1)/(outer surface) and temporarily fastened to produce a preform. Split hollow dies that form a cavity simulating the shape of a wind turbine blade were opened, the preform was fed to the cavity, the dies were clamped, and then compressed air was flowed into the hollow portion of the bladder to inflate the bladder, whereby the hollow portion of the hollow dies was pressurized. Then, the hollow dies were placed in an oven temperature-controlled to 130° C. and held for 30 minutes to produce a fiber reinforced composite material. After 30 minutes of the holding, the hollow dies were taken out, a fiber reinforced composite material (4) was demolded, and the bladder was removed from the fiber reinforced composite material (4).

The surface quality of the fiber reinforced composite material (4) was good. As a result of cross-sectional observation, no voids were observed in layers including the fiber-reinforced base material (A-1) and the thermosetting resin (a-1). In this example, the presence or absence of voids was judged by the presence or absence of voids having a diameter of 5 µm or more in a microscope observation image. In addition, the fiber reinforced composite material (4) had a hollow structure. The in-plane elongation ratio of the thermosetting resin base material (B) was 1.12.

Example 5

A fiber reinforced composite material (5) was produced by a method similar to that in Example 1 except that the prepared fiber-reinforced base material (A-1) was larger in size than the thermosetting resin base material (B-1), and two layers of the fiber-reinforced base materials (A-1) were laminated on each of the front and back of the thermosetting resin base material (B-1), that is, the fiber-reinforced base materials (A-1) and the thermosetting resin base material (B-1) were laminated to have a structure of fiber-reinforced base material (A-1)/fiber-reinforced base material (A-1)/thermosetting resin base material (B-1)/fiber-reinforced base material (A-1)/fiber-reinforced base material (A-1) to produce a laminate having a structure of ends as shown in FIG. 10.

The surface quality of the fiber reinforced composite material (5) was good. The thermosetting resin (a-1) was impregnated also into the fiber-reinforced base material (A-1) covering the ends, and no leakage of the thermosetting resin (a-1) was observed in the molding process. As a result of cross-sectional observation, no voids were observed in layers including the fiber-reinforced base material (A-1) and the thermosetting resin (a-1). In this example, the presence or absence of voids was judged by the presence or absence of voids having a diameter of 5 µm or more in a microscope observation image. The in-plane elongation ratio of the thermosetting resin base material (B) was 1.05.

Example 6

A fiber reinforced composite material (6) was produced by a method similar to that in Example 1 except that five layers in total of the fiber-reinforced base materials (A-1) and the thermosetting resin base materials (B-1) were alternately laminated to have a structure of fiber-reinforced base material (A-1)/thermosetting resin base material (B-1)/fiber-reinforced base material (A-1)/thermosetting resin base material (B-1)/fiber-reinforced base material (A-1) to produce a laminate.

The surface quality of the fiber reinforced composite material (6) was good. As a result of cross-sectional observation, no voids were observed in the outermost layers and the intermediate layer each including the fiber-reinforced base material (A-1) and the thermosetting resin (a-1). In this example, the presence or absence of voids was judged by the presence or absence of voids having a diameter of 5 µm or more in a microscope observation image. The average of in-plane elongation ratios of layers of the thermosetting resin base materials (B) was 1.13.

Example 7

In addition to the fiber-reinforced base materials (A-1) and the thermosetting resin base materials (B-1), "Achilles board (registered trademark)" manufactured by ACHILLES CORPORATION was used as the core material (C), and the base materials and the core material were laminated to have a structure of fiber-reinforced base material (A-1)/fiber-reinforced base material (A-1)/thermosetting resin base material (B-1)/fiber-reinforced base material (A-1)/core material (C)/fiber-reinforced base material (A-1)/thermosetting resin base material (B-1)/ fiber-reinforced base material (A-1)/fiber-reinforced base material (A-1)/fiber-reinforced base material (A-1) to produce a laminate. The laminate was placed in a single-sided die, the periphery of the single-sided die was covered with a sealing material (a cover film and the die were brought into close contact with each other, and the inside of the die was sealed), and then a bleeder (that plays a role of a spacer as a passage of air and resin) made of a thick nonwoven fabric was placed on the outer periphery of the laminate. A tube as a suction port was provided on the bleeder, and the sealing material and the cover film were brought into close contact with each other so that the cover film would cover the single-sided die. For the cover film, a flexible cover film was used. A vacuum pump was connected to the tube as a suction port, and the air inside the molding space (a space including the laminate formed of the single-sided die and the cover film) was sucked to depressurize the molding space, whereby the laminate was pressurized. Then, the single-sided die was placed in an oven temperature-controlled to 130° C. and held for 60 minutes to produce a fiber reinforced composite material. After 60 minutes of the holding, the single-sided die was taken out, and a fiber reinforced composite material (7) was demolded.

The surface quality of the fiber reinforced composite material (7) was good. The fiber reinforced composite material (7) had voids, and was thick and light. As a result of cross-sectional observation, no voids were observed in layers including the fiber-reinforced base material (A-1) and the thermosetting resin (a-1). In this example, the presence or absence of voids was judged by the presence or absence of voids having a diameter of 5 μm or more in a microscope observation image. The in-plane elongation ratios of layers of the thermosetting resin base materials (B) were 1.02.

Comparative Example 1

The films of the thermosetting resin (a-1) having a mass per unit area of 750 g/m$^2$ and the fiber-reinforced base materials (A-1) were laminated to have a structure of fiber-reinforced base material (A-1)/fiber-reinforced base material (A-1)/thermosetting resin (a-1)/thermosetting resin (a-1)/fiber-reinforced base material (A-1)/fiber-reinforced base material (A-1). At the time of lamination, the thermosetting resin (a-1) softened and elongated by the body temperature, and the basis weight partially decreased. The laminate was placed in double-sided dies attached to a pressing machine, and the double-sided dies were raised and lowered to apply a surface pressure of 1 MPa. The heating plate provided in the pressing machine was temperature-controlled, and the double-sided dies were heated from room temperature (25° C.) to 150° C. at a temperature rise rate of 1.5° C./min and held for 10 minutes after reaching 150° C. to produce a fiber reinforced composite material. After 10 minutes of the holding, the pressure on the double-sided dies was released, and a fiber reinforced composite material (8) was demolded.

The surface of the fiber reinforced composite material (8) formed a resin-rich part due to disturbance of the fiber-reinforced base material (A-1), and a part of the surface had an unimpregnated part.

Second Version

The method of producing a fiber reinforced composite material according to the second version is a method of producing a fiber reinforced composite material by impregnating a fiber-reinforced base material (A) with a thermosetting resin (a) and further curing the thermosetting resin (a), in which the thermosetting resin (a) has a viscosity of 1,000 Pa·s or more at 40° C., and the thermosetting resin (a) has a minimum viscosity of 10 Pa·s or less during heating from 30° C. at a temperature rise rate of 1.5° C./min, the method including steps (II) to (IV):

step (II): feeding the fiber-reinforced base material (A) and a thermosetting resin base material (B) to a molding mechanism, wherein the thermosetting resin base material (B) is a base material including the thermosetting resin (a), and a porous sheet-shaped base material (b) or a film-shaped base material (c);

step (III): supplying the thermosetting resin (a) from the thermosetting resin base material (B) to the fiber-reinforced base material (A) by pressurization with the molding mechanism to impregnate the fiber-reinforced base material (A) with the thermosetting resin (a); and step (IV): curing the thermosetting resin (a) by heating with the molding mechanism.

The thermosetting resin (a) supplied to the fiber-reinforced base material (A) and the thermosetting resin (a) remaining in the thermosetting resin base material (B) are cured in the molding step (step (IV)) to serve as a matrix resin of the fiber reinforced composite material.

Fiber-Reinforced Base Material (A)

The fiber-reinforced base material (A) is not particularly limited as long as it is a base material including a reinforced fiber, but it is preferably at least one base material selected from a textile base material, a unidirectional base material, and a mat base material. Specific examples of a preferably used fiber-reinforced base material include a reinforced fiber bundle alone, a product obtained by arranging reinforced fiber bundles in one direction and sewing the bundles together using a stitching yarn, a textile base cloth made of a continuous fiber alone or a laminate of textile base cloths, a product obtained by sewing textile base cloths made of a continuous fiber together using a stitching yarn, fiber structures such as three-dimensional textiles and braids, and a discontinuous fiber formed into a nonwoven fabric. The term "continuous fibers" means reinforced fibers that are not cut into short fibers but are obtained by aligning reinforced fiber bundles in a continuous state.

In this version, the form and arrangement of the reinforced fibers used in the fiber-reinforced base material (A) can be appropriately selected from the forms of continuous fibers such as long fibers aligned in one direction, textiles, and rovings.

Further, the fiber-reinforced base material (A) may contain other substances such as various additives as long as it includes a reinforced fiber and further has an unimpregnated part containing no resin in at least a part thereof. From the viewpoint of formativeness at the time of molding, however, the fiber-reinforced base material (A) preferably does not contain a resin, that is, the fiber-reinforced base material (A) is preferably in a dry state. That is, the fiber-reinforced base material (A) is preferably made only of a reinforced fiber.

For the purpose of obtaining a fiber reinforced composite material excellent in mechanical characteristics, it is preferable to use a textile base material or a unidirectional base material made of a continuous fiber as the fiber-reinforced base material (A). Alternatively, for the purpose of increasing the impregnation speed of the thermosetting resin (a) supplied from the thermosetting resin base material (B) and improving the productivity of the fiber reinforced composite material, it is preferable to use a mat base material made of a discontinuous fiber as the fiber-reinforced base material (A).

The type of the reinforced fiber is not particularly limited, and a glass fiber, an aramid fiber, a metal fiber and the like are suitably used. A carbon fiber is more preferable. The carbon fiber is not particularly limited. For example, carbon fibers such as polyacrylonitrile (PAN)-based, pitch-based, and rayon-based carbon fibers can be preferably used from the viewpoint of improvement in mechanical characteristics and the effect of reducing the weight of the fiber reinforced composite material. These carbon fibers may be used alone or in combination of two or more thereof. Among the carbon fibers, PAN-based carbon fibers are more preferable from the viewpoint of the balance between the strength and elastic modulus of the obtained fiber reinforced composite material. The strand strength of the reinforced fiber is preferably 3.0 GPa or more, more preferably 4.0 GPa or more, still more preferably 4.5 GPa or more. The strand elastic modulus of the reinforced fiber is preferably 200 GPa or more, more preferably 220 GPa or more, still more preferably 240 GPa or more. Use of a reinforced fiber having a strand strength and a strand elastic modulus within the preferable ranges makes it possible to further improve the mechanical characteristics of the obtained fiber reinforced composite material.

Thermosetting Resin Base Material (B) Aspect 1

In the following, an aspect of a base material in which the thermosetting resin base material (B) includes the thermosetting resin (a) and the porous sheet-shaped base material (b) will be described.

The thermosetting resin base material (B) is a base material including the thermosetting resin (a) and the porous sheet-shaped base material (b). That is, the thermosetting resin base material (B) is a base material in which the thermosetting resin (a) is supported on the porous sheet-shaped base material (b). The thermosetting resin base material (B) may contain other substances such as various additives as long as it includes the thermosetting resin (a) and the porous sheet-shaped base material (b).

The form of the thermosetting resin base material (B) is preferably a sheet shape. The thickness of the thermosetting resin base material (B) is preferably 0.5 mm or more, more preferably 1 mm or more, still more preferably 1.5 mm or more from the viewpoint of resin supply properties and mechanical characteristics. Further, the thickness of the thermosetting resin base material (B) is preferably 100 mm or less, more preferably 60 mm or less, still more preferably 30 mm or less from the viewpoint of handleability and moldability.

The mass content Wb2 of the porous sheet-shaped base material (b) in the thermosetting resin base material (B) is preferably 0.5% (mass basis) or more, more preferably 1.0% (mass basis) or more, still more preferably 1.5% (mass basis) or more from the viewpoint of handleability. The mass content Wb2 is preferably 30% (mass basis) or less, more preferably 22% (mass basis) or less, still more preferably 15% (mass basis) or less from the viewpoint of resin supply properties. When the mass content Wb2 of the porous sheet-shaped base material (b) in the thermosetting resin base material (B) is 0.5% (mass basis) or more and 30% (mass basis) or less, both the handleability at room temperature and resin supply properties at the time of molding can be achieved.

The mass content Wb2 of the porous sheet-shaped base material (b) in the thermosetting resin base material (B) is determined by the following formula:

$$Wb2 = W21/(W21+W22) \times 100 (\%)$$

W21: mass (g) of porous sheet-shaped base material (b) in thermosetting resin base material (B)
W22: mass (g) of thermosetting resin in thermosetting resin base material (B).

The mass content Wb2 of the porous sheet-shaped base material (b) in the thermosetting resin base material (B) can be determined from the mass difference before and after only the thermosetting resin (a) is removed from the sample cut out under the conditions described later. Examples of a method of removing only the thermosetting resin (a) from the thermosetting resin base material (B) include a method of placing the thermosetting resin base material (B) under heating conditions to bake off the thermosetting resin (a), and a method of immersing the thermosetting resin base material (B) in a solvent that dissolves the thermosetting resin (a) but does not dissolve the porous sheet-shaped base material (b).

As for a method of cutting out the thermosetting resin base material (B), when the thermosetting resin (a) is solid at room temperature, the thermosetting resin base material (B) is cut out with care to not crush the thermosetting resin (a), whereas when the thermosetting resin (a) is liquid at room temperature, the thermosetting resin base material (B) is cut out under freezing conditions. An example of the freezing conditions is an atmosphere of a temperature lower by 10° C. or more than the melting point of the thermosetting resin (a) obtained by differential scanning calorimetry (DSC). If the melting point cannot be detected, a method of obtaining such temperature using the glass transition point instead can be mentioned.

The volume content Vb2 of the porous sheet-shaped base material (b) in the thermosetting resin base material (B) in this aspect is preferably 0.3% (volume basis) or more, more preferably 0.6% (volume basis) or more, still more preferably 1.0% (volume basis) or more from the viewpoint of handleability. Further, the volume content Vb2 is preferably 20% (volume basis) or less, more preferably 15% (volume basis) or less, still more preferably 10% (volume basis) or less from the viewpoint of resin supply properties. When the volume content Vb2 of the porous sheet-shaped base material (b) in the thermosetting resin base material (B) is 0.3% (volume basis) or more and 20% (volume basis) or less, both the handleability at room temperature and resin supply properties at the time of molding can be achieved.

The volume content Vb2 of the porous sheet-shaped base material (b) in the thermosetting resin base material (B) is determined by the following formula:

$$Vb2 = Faw2/(\rho 2 \times Tb2 \times 10)(\%)$$

Faw2: basis weight of porous sheet-shaped base material (b) (g/m$^2$)
$\rho 2$: density of constituent material of porous sheet-shaped base material (b) (g/cm$^3$)
Tb2: thickness of thermosetting resin base material (B) (mm).

As for a method of cutting out the thermosetting resin base material (B), when the thermosetting resin (a) is solid at room temperature, the thermosetting resin base material (B) is cut out with care to not crush the thermosetting resin (a), whereas when the thermosetting resin (a) is liquid at room temperature, the thermosetting resin base material (B) is cut out under freezing conditions. An example of the freezing conditions is an atmosphere of a temperature lower by 10° C. or more than the melting point of the thermosetting resin (a) obtained by differential scanning calorimetry (DSC). If the melting point cannot be detected, a method of obtaining such temperature using the glass transition point instead can be mentioned.

Further, the volume content Vb2 of the porous sheet-shaped base material (b) can be determined by the above-mentioned formula using the thickness Tb2 (unit: mm), the basis weight Faw2 (unit: g/m²) of the porous sheet-shaped base material (b), and the density ρ2 (unit: g/cm³) of the constituent material of the porous sheet-shaped base material (b). The thickness Tb2 can be obtained using a microscope from the average of thicknesses of the thermosetting resin base material (B) at arbitrary 10 points within the range of 50 mm in length and 50 mm in width.

Porous Sheet-Shaped Base Material (b)

The porous sheet-shaped base material (b) in this aspect is not particularly limited, and examples thereof include a thermosetting resin foam and a thermoplastic resin foam. It is preferable that the porous sheet-shaped base material (b) have a tensile strength σrt2 at 40° C. of 0.5 MPa or more, and a tensile strength ratio σr2 described later of 0.5 or more to improve the handleability of the thermosetting resin base material (B).

The tensile strength σrt2 of the porous sheet-shaped base material (b) at 40° C. is an indicator of mechanical characteristics of the porous sheet-shaped base material (b) under the evaluation according to the tensile strength measurement method defined in JIS-L1913 (2010) "General nonwoven fabric test method." Further, the "tensile strength ratio σr2" as used herein is the ratio between the tensile strength σT2 of the porous sheet-shaped base material (b) at the temperature T(° C.) described below and the tensile strength σrt2 thereof at 40° C., and can be expressed by the following formula:

$$\sigma r2 = \sigma T2 / \sigma rt2$$

σrt2: tensile strength of porous sheet-shaped base material (b) at 40° C.
σT2: tensile strength of porous sheet-shaped base material (b) at temperature T(° C.)
T: temperature at which thermosetting resin (a) exhibits minimum viscosity during heating from 30° C. at temperature rise rate of 1.5° C./min.

The temperature T is a temperature at which the viscosity of the thermosetting resin (a) is minimum value during heating from 30° C. at a temperature rise rate of 1.5° C./min. When there are a plurality of temperatures at which the viscosity of the thermosetting resin (a) is minimum value, the lowest temperature among them is defined as the temperature T.

Figure 13:
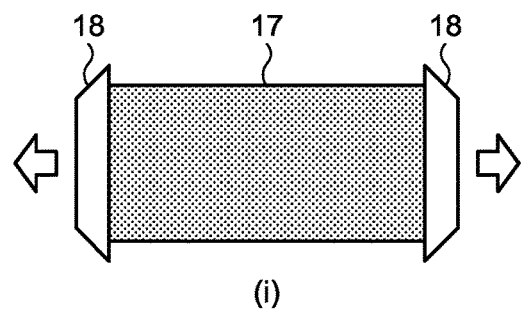
Figure 13:
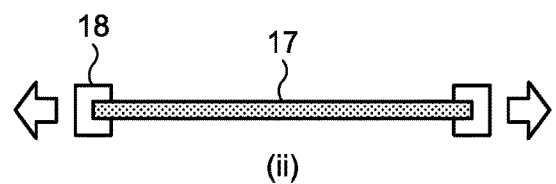
Figure 13:
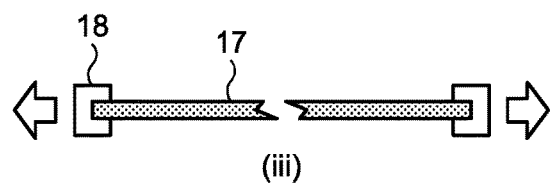

The tensile strength σrt2 of the porous sheet-shaped base material (b) in this aspect is preferably 0.5 MPa or more. The tensile strength σrt2 is more preferably 1 MPa or more, still more preferably 3 MPa or more and 1,000 MPa or less from the viewpoint of preventing breakage of a porous sheet-shaped base material 17 (FIG. 13(*iii*)) by the tension or the own weight of the porous sheet-shaped base material 17 when the porous sheet-shaped base material 17 is conveyed with both ends thereof being gripped by a clamp 18 as shown in, for example, FIG. 13(*i*). Use of such a porous sheet-shaped base material (b) makes it possible to apply high tension to the porous sheet-shaped base material (b) when the porous sheet-shaped base material (b) is gripped, and also to convey the porous sheet-shaped base material (b) without being cut (FIG. 13(*ii*)) during feeding of the thermosetting resin base material (B) to the molding mechanism so that the degree of freedom in the design of the molding mechanism can be increased.

Meanwhile, the tensile strength σT2 at the temperature T(° C.) represents the mechanical characteristics of the porous sheet-shaped base material (b) in the production of the fiber reinforced composite material by feeding the fiber-reinforced base material (A) and the thermosetting resin base material (B) to the molding mechanism, and pressurizing and heating the fiber-reinforced base material (A) and the thermosetting resin base material (B). The tensile strength ratio σr2 (=σT2/σrt2) that is the ratio between the strengths is preferably 0.5 or more, preferably 0.5 or more and 0.99 or less. The thermosetting resin base material (B) prepared using such a porous sheet-shaped base material (b) is good in handleability during the conveyance and lamination, and makes it possible to produce a fiber reinforced composite material without cutting and breakage of the porous sheet-shaped base material (b) when the thermosetting resin base material (B) is fed to the molding mechanism and pressurized and heated to give the fiber reinforced composite material so that the production process is stabilized.

Thermosetting Resin Base Material (B) Aspect 2

In the following, an aspect of a base material in which the thermosetting resin base material (B) includes the thermosetting resin (a) and the film-shaped base material (c) will be described.

The thermosetting resin base material (B) is a base material including the thermosetting resin (a) and the film-shaped base material (c). That is, the thermosetting resin base material (B) is a base material in which the thermosetting resin (a) is supported on the film-shaped base material (c). The thermosetting resin base material (B) may contain other substances such as various additives as long as it includes the thermosetting resin (a) and the film-shaped base material (c).

The thermosetting resin base material (B) of this aspect is preferably in a sheet shape including the film-shaped base material (c) and the thermosetting resin (a). The sheet thickness of the thermosetting resin base material (B) is preferably 0.5 mm or more from the viewpoint of resin supply properties and mechanical characteristics. Further, the sheet thickness of the thermosetting resin base material (B) is preferably 100 mm or less, more preferably 60 mm or less, still more preferably 30 mm or less from the viewpoint of handleability and formativeness.

Film-Shaped Base Material (c)

The form of the film-shaped base material (c) is not particularly limited, but is preferably a film, a porous film or the like. When a porous film is used as the film-shaped base material (c), a porous film having a pore size that does not allow the thermosetting resin (a) to pass therethrough is preferably used in accordance with the viscosity of the used thermosetting resin (a) at 25° C.

The main component of the film-shaped base material (c) may be an ordinary thermoplastic resin, and is not particularly limited. Polyolefins, polyamides, and polyesters are preferably used from the viewpoint of formativeness and flexibility. The term "main component" as used herein refers to a component having a proportion of 70% by mass or more and 100% by mass or less in 100% by mass of the film-shaped base material (c). When the film-shaped base material (c) is highly flexible, it is easy to process the film-shaped base material (c) to cover the thermosetting resin (a), and to increase the proportion of the thermosetting resin (a) in the formed closed space.

The value X obtained by dividing the tensile load F of the film-shaped base material (c) at the yield point measured by the tensile test (JIS K 7127 (1999)) by the width W of the test piece is preferably 1 N/mm or more, more preferably 2 N/mm or more at 25° C. When the value X at 25° C. is 1 N/mm or more, the thermosetting resin base material (B) can be easily handled during the conveyance and lamination without breakage of the film.

Further, the value X at the temperature T is preferably less than 1 N/mm, more preferably less than 0.5 N/mm. When the value X at the temperature T is less than 1 N/mm, the film-shaped base material (c) is likely to be broken during the molding, and the thermosetting resin (a) can be efficiently supplied to the fiber-reinforced base material (A).

The thickness of the film-shaped base material (c) is preferably 1 µm or more and 300 µm or less, more preferably 1 µm or more and 150 µm or less, particularly preferably 1 µm or more and 100 µm or less. When the thickness of the film-shaped base material (c) is 1 µm or more and 300 µm or less, the film-shaped base material (c) is good in handleability. Further, the thinner the film-shaped base material (c) is, the more the holding amount of the thermosetting resin (a) can be increased relative to the thickness of the thermosetting resin base material (B). That is, since the amount of the thermosetting resin (a) that can be supplied increases relative to the thickness of the thermosetting resin base material (B), the film-shaped base material (c) is preferably thin. In addition, it is preferable that the film-shaped base material (c) be thinner because the value X at the temperature T is smaller, and the film-shaped base material (c) is likely to be broken.

Further, in this aspect, the film-shaped base material (c) generally forms a closed space. Thus, there is no need to perforate the film-shaped base material (c) before molding, and the region where the thermosetting resin (a) is present is separated from the outside by the film-shaped base material (c) and is defined as a closed space. Therefore, no leakage of an uncured resin occurs, and it is possible to use a low-viscosity thermosetting resin (a). The closed space means a space surrounded by the film-shaped base material (c) that does not allow the thermosetting resin (a) to pass therethrough at 25° C. under atmospheric pressure, and the film-shaped base material (c) that forms the space may have pores of a size that does not allow the thermosetting resin (a) to pass therethrough at 25° C. under atmospheric pressure.

Thermosetting Resin (a)

The thermosetting resin (a) in this aspect exhibits characteristics that it has a viscosity of 1,000 Pa·s or more at 40° C., and has a minimum viscosity of 10 Pa·s or less during heating from 30° C. at a temperature rise rate of 1.5° C./min. The thermosetting resin (a) having a viscosity of 1,000 Pa·s or more at 40° C. and a minimum viscosity of 10 Pa·s or less during heating from 30° C. at a temperature rise rate of 1.5° C./min achieves both the handleability at the time of feeding of the thermosetting resin base material (B) to the molding mechanism and the impregnating property of the thermosetting resin (a) into the fiber-reinforced base material (A) in the production of the fiber reinforced composite material by pressurization and heating in the molding mechanism.

The viscosity of the thermosetting resin (a) at 40° C. is preferably 1,000 Pa·s or more from the viewpoint of handleability, and is preferably 10 kPa·s or less from the viewpoint of processability of the thermosetting resin (a) in the preparation of the thermosetting resin base material (B). In addition, the minimum viscosity of the thermosetting resin (a) during heating from 30° C. at a temperature rise rate of 1.5° C./min is preferably 10 Pa·s or less from the viewpoint of the impregnating property into the fiber-reinforced base material (A) at the time of molding, and is preferably 1 mPa·s or more from the viewpoint of mechanical characteristics of a cured product of the thermosetting resin (a).

When the viscosity of the thermosetting resin (a) at 40° C. is 1,000 Pa·s or more, it is possible to prevent dripping away of the thermosetting resin (a) from the thermosetting resin base material (B) during feeding of the thermosetting resin (a) in the thermosetting resin base material (B) to the molding mechanism. The dripping of the thermosetting resin (a) from the thermosetting resin base material (B) not only contaminates the periphery of the molding mechanism but also disturbs the input of the fiber-reinforced base material (A) prepared in advance and the thermosetting resin base material (B) that are fed to the molding mechanism, making it difficult to produce a fiber reinforced composite material having a desired construction.

Meanwhile, when the minimum viscosity of the thermosetting resin (a) during heating from 30° C. at a temperature rise rate of 1.5° C./min is 10 Pa·s or less, the thermosetting resin (a) can be promptly supplied to the fiber-reinforced base material (A) and exhibits a good impregnating property in the production of the fiber reinforced composite material by feeding of the fiber-reinforced base material (A) and the thermosetting resin base material (B) to the molding mechanism, and heating and pressurization thereof. Improvement in the impregnating property suppresses generation of voids in the obtained fiber reinforced composite material as well as increases the degree of freedom in designing the production process.

The thermosetting resin (a) in this aspect is not particularly limited as long as it is a resin having thermosetting properties and having the above-mentioned viscosity characteristics, and is preferably at least one thermosetting resin selected from an epoxy resin, a vinyl ester resin, a phenol resin, a thermosetting polyimide resin, a polyurethane resin, a urea resin, a melamine resin, and a bismaleimide resin. Among these thermosetting resins, an epoxy resin is particularly preferable as the thermosetting resin (a) from the viewpoint of the balance between the temporal stability of the thermosetting resin base material (B) and the mechanical characteristics of the obtained fiber reinforced composite material. Besides use of an epoxy resin alone, a copolymer with a thermosetting resin containing an epoxy resin as a main component, a modified product of an epoxy resin, and a thermosetting resin that is a blend of two or more epoxy resins can also be used.

Moreover, the thermosetting resin (a) in this aspect preferably has a cure index of 85% or more as measured by an ion viscometer after heated at 150° C. for 5 minutes. The cure index is an indicator of the degree of curing reaction of the thermosetting resin (a). The higher the cure index is, the easier the demolding of the obtained fiber reinforced composite material from the molding mechanism so that the time taken to heat and cure the thermosetting resin (a) to form a fiber reinforced composite material can be shortened. Therefore, the heating time in the process of producing the fiber reinforced composite material by feeding the thermosetting resin base material (B) and the fiber-reinforced base material (A) to the molding mechanism can be shortened, and productivity can be improved. The cure index as measured by an ion viscometer after the thermosetting resin (a) is heated at 150° C. for 5 minutes is preferably 100% or less.

In this aspect, the viscosity of the thermosetting resin (a) in the thermosetting resin base material (B) at the preheating temperature and the molding temperature in the molding step described later is preferably 1,000 Pa·s or less, more preferably 100 Pa·s or less, still more preferably 10 Pa·s or less at either of the temperatures. When the viscosity of the thermosetting resin (a) in the thermosetting resin base material (B) at the preheating temperature and the molding temperature is 1,000 Pa·s or less, the thermosetting resin (a) is sufficiently impregnated into the fiber-reinforced base material (A), and generation of voids in the obtained fiber reinforced composite material can be suppressed.

Production Method

The method of producing a fiber reinforced composite material according to the second version is a method of producing a fiber reinforced composite material by impregnating a fiber-reinforced base material (A) with a thermosetting resin (a) and further curing the thermosetting resin (a), the method including steps (II) to (IV) described later. More preferably, the method includes step (I) described later. Hereinafter, the method of producing a fiber reinforced composite material according to the second version will be described.

Step (I)

The method of producing a fiber reinforced composite material according to the second version preferably includes, before step (II), step (I) of making the porous sheet-shaped base material (b) or the film-shaped base material (c) support the thermosetting resin (a) to prepare the thermosetting resin base material (B). Examples of the method of making the porous sheet-shaped base material (b) or the film-shaped base material (c) support the thermosetting resin (a) to prepare the thermosetting resin base material (B) include, when the porous sheet-shaped base material (b) is used, a method of forming the thermosetting resin (a) into a film shape conforming to a designated basis weight, applying the film to at least one surface of the porous sheet-shaped base material (b), heating and pressurizing the resulting laminate at a temperature at which the curing reaction of the thermosetting resin (a) does not proceed to make the porous sheet-shaped base material (b) support the thermosetting resin (a), and winding up the resulting laminate. Further, when the viscosity of the thermosetting resin (a) is low and processing into a film shape is difficult, it is also possible to employ a method of making the porous sheet-shaped base material (b) support the thermosetting resin (a) by directly applying the thermosetting resin (a) to the porous sheet-shaped base material (b) or immersing the porous sheet-shaped base material (b) in the thermosetting resin (a).

Examples of a heating and pressurizing method of making the porous sheet-shaped base material (b) support the thermosetting resin (a) include methods using a multistage roll having a heat source such as a heater, a double belt press or the like. These methods have an advantage of providing an elongated thermosetting resin base material (B) because they are capable of continuously conveying the thermosetting resin (a) and the porous sheet-shaped base material (b) to the heating and pressurizing mechanism.

Another example of the preparation method is a method of preparing the thermosetting resin base material (B) by a division method. An example of the division method is a vacuum bag method of placing the porous sheet-shaped base material (b) cut into a predetermined size and the thermosetting resin (a) weighed in advance in a closed space, depressurizing the inside of the closed space, and heating the closed space for a predetermined time at a temperature at which the curing reaction of the thermosetting resin (a) does not proceed to replace the air present inside the porous sheet-shaped base material (b) with the thermosetting resin (a), thereby making the porous sheet-shaped base material (b) support the thermosetting resin (a).

When making the porous sheet-shaped base material (b) support the thermosetting resin (a) in step (I), it is preferable to heat the thermosetting resin (a) to a temperature at which the curing reaction of the thermosetting resin (a) does not proceed. The viscosity of the thermosetting resin (a) is reduced by heating, and an effect of promoting permeation of the thermosetting resin (a) into porous sheet-shaped base material (b) is exerted. The viscosity of the thermosetting resin (a) at a temperature at which the curing reaction does not proceed is preferably 1,000 Pa·s or less, more preferably 100 Pa·s or less, still more preferably 10 Pa·s or less. A viscosity of the thermosetting resin (a) at a temperature at which the curing reaction does not proceed of 1,000 Pa·s or less is preferable because the thermosetting resin (a) sufficiently permeates into the porous sheet-shaped base material (b) to reduce the unevenness in the resin content and thickness unevenness of the obtained thermosetting resin base material (B), and the fiber reinforced composite material produced using the thermosetting resin base material (B) is reduced in uneven supply of the thermosetting resin (a) to the fiber-reinforced base material (A), has few voids, and is high in quality.

In step (I), it is more preferable to pressurize the thermosetting resin (a) and the porous sheet-shaped base material (b) when making the porous sheet-shaped base material (b) support the thermosetting resin (a). The pressurization promotes the permeation of the thermosetting resin (a) into the porous sheet-shaped base material (b). The pressure in the pressurization is preferably 0.1 MPa or more and 10 MPa or less. A pressure within the above-mentioned range is preferable because a sufficient effect of promoting the permeation owing to the pressurization can be obtained, and it is possible to make the thermosetting resin (a) efficiently permeate into the porous sheet-shaped base material (b).

Examples of the method of preparing the thermosetting resin base material (B) by making the film-shaped base material (c) support the thermosetting resin (a) include the following methods. One side of the film-shaped base material (c) made into a tube shape by an inflation method is joined up to produce a bag closed on three sides. A bag can also be produced by a method of superimposing two film-shaped base materials (c) on each other and joining up the base materials leaving a mouth for receiving the thermosetting resin (a), and a method of folding one film-shaped base material (c) and joining up the base material leaving a mouth for receiving the thermosetting resin (a). The thermosetting resin base material (B) can be prepared by putting the thermosetting resin (a) in the obtained bag and joining the open mouth. When it is possible to form the thermosetting resin (a) into a film shape, the thermosetting resin base material (B) can also be prepared by sandwiching the film-shaped thermosetting resin (a) between film-shaped base materials (c) and joining up the ends.

Step (II)

The method of producing a fiber reinforced composite material according to the second version includes step (II) of feeding the fiber-reinforced base material (A) and the thermosetting resin base material (B) to the molding mechanism. Examples of the form of feeding the fiber-reinforced base material (A) and the thermosetting resin base material (B) to the molding mechanism include, as a division method, a method of cutting the fiber-reinforced base material (A) and the thermosetting resin base material (B) into a desired shape and a desired size, laminating the cut fiber-reinforced base material (A) and thermosetting resin base material (B) into a preform, and then feeding the preform to the molding mechanism. The molding mechanism is not limited as long as it is a mechanism into which the preform is introduced and that is intended for imparting a shape to the preform. Examples of the molding mechanism include a pressing machine having a pair of male and female double-sided dies and a shaping die having a shape on one surface.

In addition, it is preferable that the fiber-reinforced base material (A) and the thermosetting resin base material (B) be elongated, and the fiber-reinforced base material (A) and the thermosetting resin base material (B) be continuously fed to the molding mechanism. The elongated shape means that the length of the base material in the longitudinal direction is 10 m or more. An example of the method of continuously feeding the fiber-reinforced base material (A) and the thermosetting resin base material (B) include a method of subjecting the elongated fiber-reinforced base material (A) and the elongated thermosetting resin base material (B) to a step of sending out the fiber-reinforced base material (A) and the thermosetting resin base material (B) each placed on a creel and winding up the fiber-reinforced base material (A) and the thermosetting resin base material (B) with a winding mechanism such as a winder under tension, the method including use of the molding mechanism between the sending mechanism and the winding mechanism in the step. The above-mentioned method has an advantage that the fiber-reinforced base material (A) and the thermosetting resin base material (B) can be continuously fed to the molding mechanism. The molding mechanism is not particularly limited as long as it is a mechanism to impart a shape, and examples of the mechanism include a mechanism capable of continuous molding such as a multistage roll and a double belt press.

Further, in step (II), the thermosetting resin base material (B) is fed to the molding mechanism with at least one side surface of the thermosetting resin base material (B) being sealed with the fiber-reinforced base material (A), whereby the flow of the thermosetting resin base material (B) is stopped, and the thermosetting resin (a) can be efficiently supplied to the fiber-reinforced base material (A). The side surface of the thermosetting resin base material (B) means a surface of the thermosetting resin base material (B) parallel to the thickness direction of the thermosetting resin base material (B). Depending on the shape of the obtained fiber reinforced composite material or the shape of the die, it is preferable to seal at least one side surface of the thermosetting resin base material (B), and it is more preferable to seal all the side surfaces thereof. The method of sealing the thermosetting resin base material (B) with the fiber-reinforced base material (A) is not particularly limited. Examples of the method include a method of wrapping a thermosetting resin base material (B) with a fiber-reinforced base material (A), and a method of sandwiching a thermosetting resin base material (B) with two fiber-reinforced base materials (A) and clamping the joint. Further, the fiber-reinforced base material (A) to seal the thermosetting resin base material (B) may be in close contact with the side surface of the thermosetting resin base material (B) or may form a space with the thermosetting resin base material (B).

Preheating Step

Further, the method of producing a fiber reinforced composite material according to the second version preferably includes a step of preliminarily heating (preheating) the thermosetting resin base material (B) before step (II). When the thermosetting resin base material (B) is preheated before being fed to the molding mechanism, since the thermosetting resin base material (B) is fed to the molding mechanism in a softened state, the thermosetting resin base material (B) is improved in shape followability as compared to when the thermosetting resin base material (B) is fed to the molding mechanism at room temperature.

The temperature in the preheating may be the same as or different from the temperature at which the thermosetting resin (a) is cured in step (IV) described later. When the preheating temperature is the same as the curing temperature, the preheating time is preferably within 10 minutes from the viewpoint of the viscosity increase of the thermosetting resin (a) caused by the curing reaction of the thermosetting resin (a).

In addition, from the viewpoint of resin flow and shape followability, the preheating temperature is preferably lower by 10° C. or more than the temperature at which the thermosetting resin (a) exhibits the minimum viscosity during heating at a temperature rise rate of 1.5° C./min. A preheating temperature lower by 10° C. or more than the temperature at which the thermosetting resin (a) exhibits the minimum viscosity during heating at a temperature rise rate of 1.5° C./min is preferable because the thermosetting resin base material (B) satisfactorily follows the desired shape to be improved in formativeness, and a fiber reinforced composite material having a complicated shape can be easily obtained.

Examples of the preheating method include a method of bringing the thermosetting resin base material (B) into direct contact with a hot plate equipped with a heater or the like, and an atmospheric heating method of heating the thermosetting resin base material (B) in a space temperature-controlled by hot air.

Step (III)

The method of producing a fiber reinforced composite material according to the second version includes step (III) of supplying the thermosetting resin (a) from the thermosetting resin base material (B) to the fiber-reinforced base material (A) by pressurization with the molding mechanism to impregnate the fiber-reinforced base material (A) with the thermosetting resin (a). Examples of the method of pressurization in step (III) include a continuous method and a division method.

An example of the continuous method is a method of pressurizing, with a multistage roll or a double belt press for pressurization, the fiber-reinforced base material (A) and the thermosetting resin base material (B) fed to the molding mechanism while conveying the fiber-reinforced base material (A) and the thermosetting resin base material (B) themselves.

An example of the division method is a method of forming a preform in advance from the fiber-reinforced base material (A) and the thermosetting resin base material (B), and then pressurizing the preform. Examples of the method of pressurization in the division method include a method of attaching double-sided dies to a pressing machine, and clamping the double-sided dies for pressurization, and a method of placing a preform including the fiber-reinforced base material (A) and the thermosetting resin base material (B) in a closed space formed of a one-sided shaping die and a flexible film, and depressurizing the closed space. In the latter case, since the closed space as a molding space has a pressure lower than that of the outside, the laminate (preform) of the fiber-reinforced base material (A) and the thermosetting resin base material (B) is brought into a pressurized state.

Step (IV)

The method of producing a fiber reinforced composite material according to the second version includes step (IV) of curing the thermosetting resin (a) by heating with the molding mechanism. The heating temperature can be set based on the curing rate of the thermosetting resin (a), and the time from the feeding of the fiber-reinforced base material (A) and the thermosetting resin base material (B) to the molding mechanism to the taking out of the same (molding time), and it is preferably within the range of 100° C. or higher and 300° C. or lower. Setting the heating temperature within the above-mentioned range is preferable because it is possible to shorten the molding cycle and improve the productivity of the fiber reinforced composite material.

Simultaneous Progress of Step (III) and Step (IV)

In this aspect, it is preferable to simultaneously progress the pressurization in step (III) and the heating in step (IV). To simultaneously progress the pressurization in step (III) and the heating in step (IV) means that the time during which the pressurization in step (III) is performed and the time during which the heating in step (IV) is performed overlap each other, that is, there is a time during which both the operations are performed simultaneously. Therefore, the start time and the end time may be different between step (III) and step (IV). In other words, our methods include an aspect in which pressurization and heating are started simultaneously and ended simultaneously as well as an aspect in which pressurization is started and then heating is started, and then pressurization is ended and heating is finally ended, an aspect in which pressurization is started and then heating is started, and then heating is ended and pressurization is finally ended, and an aspect in which pressurization and heating are started simultaneously, and then pressurization is ended and heating is finally ended.

It is preferable that there be a time during which both the pressurization in step (III) and the heating in step (IV) are performed simultaneously, because it is possible to utilize both the shaping effect and the effect of promoting impregnation of the thermosetting resin (a) into the fiber-reinforced base material (A), which are brought about by the pressurization in step (III), and the effect of improving the shape followability of the thermosetting resin base material (B) due to softening and the effect of improving the impregnating property of the thermosetting resin (a) into the reinforced fiber due to a decrease in the viscosity of the thermosetting resin (a), which are brought about by the heating in step (IV).

Press Molding with Double-Sided Dies

The method of producing a fiber reinforced composite material according to the second version is preferably a method in which the molding mechanism has a pair of double-sided dies, and a preform including the fiber-reinforced base material (A) and the thermosetting resin base material (B) is molded in the double-sided dies (hereinafter, this method is referred to as a "press molding method") (FIG. 2). In an example of such a molding method, a preform 3 including a fiber-reinforced base material (A) and a thermosetting resin base material (B) is produced in advance and placed in dies (double-sided dies 4A and 4B), the preform is pressurized and shaped by clamping with the double-sided dies, and a thermosetting resin (a) is supplied to the fiber-reinforced base material (A) and impregnated into the fiber-reinforced base material (A). Then, the dies are heated to cure the thermosetting resin (a). The dies may be heated to the molding temperature before the preform 3 is placed, or may be heated to the molding temperature after the dies heated to the temperature at which the preform 3 softens are pressurized. The former method has an effect of shortening the molding cycle because it does not require cooling and heating of the dies, whereas the latter method has an effect of improving the surface quality of the obtained fiber reinforced composite material because it improves the shape followability.

It is more preferable to preheat the preform 3 before being placed in the double-sided dies (before step (II)) to soften the thermosetting resin base material (B) because the shape followability is improved.

In placing the preform 3 on the double-sided dies, it is preferable to use a blank holder 5 to hold the preform 3 (FIG. 3). Since the blank holder 5 can fix the ends of the preform 3 by sandwiching the ends of the preform 3, the side leakage of the thermosetting resin (a) discharged from a thermosetting resin base material 1 can be prevented, and a fiber-reinforced base material 2 can be impregnated with the thermosetting resin (a) without waste. The blank holder also has an advantage that it can assist setting of the preform 3 into the dies and taking out of the preform 3 from the dies.

Moreover, in step (III), it is preferable that clamping be started at a surface pressure P1 (MPa), and completed at a surface pressure P2 (MPa) higher than the surface pressure P1. The surface pressure P2 is more preferably twice or more the surface pressure P1, and is still more preferably three times or more the surface pressure P1. That is, it is possible to achieve both the molding in a complicated shape and stable impregnation of the resin by preferentially shaping the preform at a lower pressure since the viscosity of the resin is high at the start of clamping, and supplying the resin at a higher pressure to the shaped preform at the completion of clamping. In this aspect, as long as the relationship between the surface pressure P1 at the start of clamping and the surface pressure P2 at the completion of clamping satisfies the condition: P2>P1, the value of surface pressures in the middle of clamping and the magnitude relationship between the surface pressures are not particularly limited. However, it is preferable to employ a method of holding the preform at the surface pressure P1 at the start of clamping to shape the preform, and then increasing the pressure up to the surface pressure P2 at the completion of clamping.

Molding with Single-Sided Die and Cover Film

In the production method according to the second version, it is preferable that the molding mechanism have a single-sided die 6, and a preform 3 including the fiber-reinforced base material (A) and the thermosetting resin base material (B) be placed in the single-sided die 6, further packed with a cover film 7, and molded (FIG. 4). In an example of such a molding method, the preform 3 including the fiber-reinforced base material (A) and the thermosetting resin base material (B) is produced, and placed in the single-sided die 6. The preform 3 is placed between the cover film 7 and the single-sided die 6, and an end of the cover film 7 having a size larger than that of the preform 3 is brought into close contact with the single-sided die 6 using a sealing material. A suction port 8 is provided in a part of the close contact surface between the cover film 7 and the single-sided die 6, and the air present inside the molding space (a space formed by the single-sided die 6 on which the preform 3 is placed and the cover film 7) is sucked from the suction port using a vacuum pump to depressurize the molding space. In this case, since the molding space has a lower pressure than in the outside, the preform 3 is in a pressurized state. Then, the preform is put in a hot air oven or the like and heated, whereby the thermosetting resin (a) is melted and impregnated into the fiber-reinforced base material (A), and the curing reaction proceeds to give a fiber reinforced composite material. In this molding method, since the gas present inside the molding space is sucked and the molding space is depressurized, the air contained in the fiber-reinforced base material (A) is also removed. Therefore, void formation in the obtained fiber reinforced composite material is suppressed, and an effect of imparting good mechanical characteristics and surface quality is exerted.

Depressurization by a vacuum pump may be stopped or continued at the time of heating, but the depressurization is preferably continued also during the heating from the viewpoint of suppressing the voids in the obtained fiber reinforced composite material. In addition, it is preferable to use a flexible film for the cover film 7 since such a film is good in followability to a single-sided die.

Molding with Hollow Die

In the method of producing a fiber reinforced composite material according to the second version, it is preferable that the molding mechanism have a hollow die, a preform including the fiber-reinforced base material (A) and the thermosetting resin base material (B) be placed in a hollow portion, and the hollow portion be pressurized. In an example of such a molding method, a preform including the fiber-reinforced base material (A) and the thermosetting resin base material (B) is produced, and placed to be applied to a molding surface in the hollow die. The hollow portion is pressurized to shape the preform and supply the thermosetting resin (a) to the fiber-reinforced base material (A), and the inside of the hollow die is heated to cure the thermosetting resin (a). The hollow die may be heated to the molding temperature before the preform is placed, or may be heated to the molding temperature after the preform is placed in the hollow portion of the hollow die heated to the temperature at which the preform softens, and the hollow portion is pressurized. The former method has an effect of shortening the molding cycle because it does not require cooling and heating of the hollow die, whereas the latter method has an effect of improving the surface quality of the obtained fiber reinforced composite material because it improves the shape followability. Further, the hollow die may be of integrated type formed of one rigid body having a hollow portion, or may be of split type formed of a combination of a plurality of rigid bodies to constitute a hollow portion. Examples of a method of pressurizing the hollow portion include a method of allowing compressed air to flow into the hollow portion.

Molding with Core Die

More preferably, the molding mechanism further has a core die (FIG. 5). In such a molding method, the molding mechanism has a core die 10 in addition to the hollow dies (9A and 9B). It is allowable to place the preform 3 including the fiber-reinforced base material (A) and the thermosetting resin base material (B) in the hollow portion of the hollow dies (9A and 9B) and insert the core die 10 into the preform 3, or to insert, into the hollow portion formed by the hollow dies (9A and 9B), the core die 10 and the preform 3 placed on the surface of the core die 10. As a pressurizing method, a gas is preferably introduced into the core die 10 to inflate the core die 10. The core die 10 is preferably a thermoplastic resin bladder capable of uniformly applying a pressure even at high temperatures. Such a molding method has an effect of easily producing a fiber reinforced composite material having a hollow shape since the outer surface of the preform 3 is pressed against the dies.

Molding with Take-Up Mechanism

In the method of producing a fiber reinforced composite material according to the second version, it is preferable that the molding mechanism have a mechanism to take up the fiber-reinforced base material (A) and the thermosetting resin base material (B) while pressurizing the fiber-reinforced base material (A) and the thermosetting resin base material (B). In an example of such a molding method, a fiber reinforced composite material having a constant cross section is continuously produced by continuously feeding a laminate 16 (see FIG. 1) including an elongated fiber-reinforced base material (A) and an elongated thermosetting resin base material (B) to a molding mechanism, pressurizing and shaping the laminate 16 to supply the thermosetting resin (a) to the fiber-reinforced base material (A), and heating the laminate 16 to cure the thermosetting resin (a) in the molding mechanism. From the viewpoint of a continuous molding cycle, it is preferable to simultaneously progress the pressurization in step (III) and the heating in step (IV) for molding. Such a molding method has an effect of easily producing an elongated fiber reinforced composite material having a constant cross section. The molding mechanism may be a through die having a through hole or a pressing die having a shaping surface on the surface of a rigid body. A mold having a heating mechanism such as a heater can simultaneously perform pressurization and heating.

An example of a through die 11 is, as shown in FIG. 6, a through die that is a rigid body having a through hole, that has on one surface thereof a supply port through which the laminate 16 including the fiber-reinforced base material (A) and the thermosetting resin base material (B) is to be supplied, and that has, on a surface opposite to the surface on which the supply port is provided, a pull-out port for pulling out the obtained fiber reinforced composite material. At the time of molding, the laminate 16 including the fiber-reinforced base material (A) and the thermosetting resin base material (B) is continuously fed from the supply port, passed through the through hole, and pulled out from the pull-out port so that the laminate 16 is pressurized and shaped in the through die 11, and the thermosetting resin (a) is supplied to the fiber-reinforced base material (A) and heated to be cured. A preferable shape of the through die 11 is a shape in which the supply port is larger than the pull-out port and the through hole is tapered, since such a shape facilitates the pressurization. Examples of heating of such a molding mechanism include, in addition to atmospheric heating of performing heating in a furnace, direct heating of performing heating with a heating mechanism such as a heater provided in the through die 11 itself.

Further, as a pressing die 12, it is preferable to use a die as shown in FIG. 7, which is made of a rigid body and has a pressing surface capable of uniformly pressurizing the laminate 16 including the fiber-reinforced base material (A) and the thermosetting resin base material (B) at the time of molding. At the time of molding, the laminate 16 including the fiber-reinforced base material (A) and the thermosetting resin base material (B) is continuously conveyed under tension, the laminate 16 is pressed against the molding surface of the pressing die 12 so that the laminate 16 is pressurized and shaped and the thermosetting resin (a) is supplied to the fiber-reinforced base material (A), and the laminate 16 is heated so that the thermosetting resin (a) is cured. As for the shape of the pressing die 12, the angle $\theta 13$ of contact between the surface of the die and the surface of the laminate 16 including the fiber-reinforced base material (A) and the thermosetting resin base material (B) fed to the die is preferably 15° to 45°, more preferably 25° to 40°. If the angle is small, sufficient pressure is not applied so that not only the supply of the thermosetting resin (a) to the fiber-reinforced base material (A) is insufficient but also the problem that the laminate cannot be molded into a desired shape may occur. On the other hand, if the angle $\theta 13$ is large, an excessive stress is applied so that the laminate 16 including the fiber-reinforced base material (A) and the thermosetting resin base material (B) may be cut during the molding. Examples of heating of such a molding mechanism include, in addition to atmospheric heating of performing heating in a furnace, direct heating of performing heating with a heating mechanism such as a heater provided in the pressing die 12 itself.

Further, in the mechanism to take up the fiber-reinforced base material (A) and the thermosetting resin base material (B) while pressurizing them, a double belt press (14A and 14B) can be suitably used as a pressurizing mechanism (FIG. 8). Employing such a pressurizing mechanism has an effect of improving the productivity of the fiber reinforced composite material because it facilitates continuous molding of a fiber reinforced composite material.

It is also preferable to use an intermittent press system having two or more molding mechanisms including a molding mechanism for heating and a molding mechanism for cooling arranged in parallel. Use of a press system in which the molding mechanism for heating and the molding mechanism for cooling are separated from each other is preferable because it eliminates the need for a step of raising and lowering the temperature in the molding mechanism so that the productivity of the fiber reinforced composite material can be improved.

Suitable Aspect of Fiber-Reinforced Base Material (A) and Thermosetting Resin Base Material (B) in Step (II)

In this aspect, in step (II), the thermosetting resin base material (B) is preferably covered with the fiber-reinforced base material (A). More preferably, the thermosetting resin base material (B) is completely covered with the fiber-reinforced base material (A), and the thermosetting resin base material (B) is not exposed at all. Such a form has an effect of preventing leakage of the thermosetting resin (a) discharged from the thermosetting resin base material (B) to the outside of the molding region, as well as an effect of supplying the resin to the fiber-reinforced base material (A) without waste. As shown in FIGS. 9 and 10, examples of the form of covering the thermosetting resin base material (B) with the fiber-reinforced base material (A) include a form in which a fiber-reinforced base material (A) is wound around a thermosetting resin base material (B) and a form in which a plurality of fiber-reinforced base materials (A) are put on a thermosetting resin base material (B).

In molding by the continuous method, the above-mentioned effects can be exerted when the cross section of the laminate including the fiber-reinforced base material (A) and the thermosetting resin base material (B) in a direction orthogonal to the direction in which the laminate is conveyed to the molding mechanism has the construction as shown in FIG. 9 or 10.

Meanwhile, in molding by the division method, the above-mentioned effects can be exerted when an arbitrary cross section of the preform has the construction as shown in FIG. 9 or 10.

In this aspect, it is preferable in step (II) that the fiber-reinforced base material (A) be fed to the molding mechanism in a state where the fiber-reinforced base material (A) is in contact with the molding mechanism, and at least a part of the thermosetting resin base material (B) be covered with the fiber-reinforced base material (A). It is preferable that the molding mechanism and the fiber-reinforced base material (A) are in contact with each other because friction with the molding mechanism is reduced, and the shape followability is improved. Examples of the method of feeding the fiber-reinforced base material (A) to the molding mechanism in a state where the fiber-reinforced base material (A) is in contact with the molding mechanism include, when the molding mechanism is a press mechanism to sandwich the laminate between upper and lower dies, a method of placing the fiber-reinforced base material (A) on the lowermost surface or the uppermost surface of the molding mechanism.

In this aspect, it is preferable in step (II) that the fiber-reinforced base material (A) and the thermosetting resin base material (B) be fed to the molding mechanism in a state where the fiber-reinforced base material (A) is in direct contact with the thermosetting resin base material (B). When the fiber-reinforced base material (A) and the thermosetting resin base material (B) are fed to the molding mechanism in a state where the fiber-reinforced base material (A) is in direct contact with the thermosetting resin base material (B), in supplying the thermosetting resin (a) in step (III), surface injection of supplying the thermosetting resin (a) at the contact surface is realized. Therefore, the impregnating property is improved, and the molding cycle can be shortened.

As for a form of bringing the fiber-reinforced base material (A) and the thermosetting resin base material (B) into direct contact with each other, each one layer of the fiber-reinforced base material (A) and the thermosetting resin base material (B) may be laminated, or a plurality of layers of the fiber-reinforced base materials (A) and the thermosetting resin base materials (B) may be laminated.

In this aspect, it is preferable in step (II) that a laminate of a total of four or more layers of the fiber-reinforced base materials (A) and the thermosetting resin base materials (B) be fed to the molding mechanism. Above all, it is preferable to alternately laminate four or more layers in total of the fiber-reinforced base materials (A) and the thermosetting resin base materials (B) (FIG. 11) from the viewpoint of the impregnating property of the thermosetting resin (a), and this form has an effect of improving the freedom of design of the thickness of the fiber reinforced composite material. The upper limit of the number of laminated layers is not particularly limited, but the number of laminated layers is preferably 100 or less from the viewpoint of the quality of the obtained fiber reinforced composite material. Feeding the fiber-reinforced base materials (A) and the thermosetting resin base materials (B) in such a form to the molding mechanism is preferable because a good-quality fiber reinforced composite material having an arbitrary thickness can be produced.

It is preferable in step (II) that a core material (C) (core material 15) be further fed to the molding mechanism in addition to the fiber-reinforced base material (A) and the thermosetting resin base material (B). When the fiber-reinforced base material (A), the thermosetting resin base material (B), and the core material (C) are fed to the molding mechanism in such a construction, it is easy to control the increase in thickness, improvement in rigidity, weight reduction and the like of the obtained fiber reinforced composite material (FIG. 12).

Preferably, the fiber-reinforced base material (A) is laminated on the surface of the core material (C) so that the core material (C) and the thermosetting resin base material (B) do not come into direct contact with each other. With such a construction, impregnation of the thermosetting resin (a) into the core material (C) is suppressed, and a lightweight and high-quality fiber reinforced composite material can be obtained.

The core material (C) is suitably a foamed foam. A foamed foam suitable as the core material (C) may be a foamed foam having closed cells or a foamed foam having open cells, but a foamed foam having closed cells is preferable from the viewpoint of suppressing the impregnation of the thermosetting resin (a) into the foamed foam. Examples of the foamed foam include, besides rigid urethane foams and hard acrylic foams, foam materials obtained by coating a network structure formed by raising the surface of reinforced fibers with a resin.

EXAMPLES

In the following, examples will be shown to describe this version more specifically. First, evaluation methods will be described.

Evaluation Method 1: Viscosity Measurement of Thermosetting Resin

The viscosity of the thermosetting resin was measured using a dynamic viscoelasticity device ARES-2KFRTN1-FCO-STD (manufactured by TA Instruments Japan Inc.) on a parallel plate including flat plates each having a diameter of 40 mm as upper and lower measuring jigs by setting the thermosetting resin at a distance between the upper and lower jigs of 1 mm, and then performing the measurement at a measurement starting temperature of 30° C. and a temperature rise rate of 1.5° C./min in a torsion mode (measurement frequency: 0.5 Hz). From the obtained data, the viscosity at the temperature of 40° C. and the viscosity at the temperature T(° C.) were determined, where the temperature T(° C.) is the temperature at which the measured resin viscosity is minimum.

Evaluation Method 2: Cure Index of Thermosetting Resin

A dielectric measuring device (MDE-10 cure monitor manufactured by Holometrix-Micromet) was used as an ion viscometer. An O-ring made from VITON having an inner diameter of 32 mm and a thickness of 3 mm was installed on the lower surface of a programmable mini-press MP2000 having a TMS-1 inch sensor embedded in the lower surface thereof, the temperature of the press was set at 150° C., the thermosetting resin was poured inside of the O-ring, the press was closed, and the temporal change of the ion viscosity of the thermosetting resin was tracked. The measurement was performed at frequencies of 10 Hz, 100 Hz, 1,000 Hz, and 10,000 Hz, and the logarithm Log α of frequency-independent ion viscosity was obtained using the attached software. The cure index (%) after the thermosetting resin was heated at 150° C. for 5 minutes was calculated from the following formula:

Cure index=(Log α$t$–Log αmin)/(Log αmax–Log αmin)×100

α$t$: ion viscosity after 5 minutes (unit: Ω·cm)
αmin: minimum value of ion viscosity (unit: Ω·cm)
αmax: maximum value of ion viscosity (unit: Ω·cm).

Evaluation Method 3: Tensile Strength σRt2 of Porous Sheet-Shaped Base Material

Using a porous sheet-shaped base material, test pieces each having a width of 50 mm and a length of 280 mm were cut out in a certain direction as the reference of 0° and in the directions of +45°, +90°, and −45°, and the tensile strength at 40° C. was evaluated in accordance with the tensile strength measurement method defined in JIS-L1913 (2010), "General nonwoven fabric test method." As the testing machine, "Instron" (registered trademark) universal testing machine (manufactured by Instron) was used. The tensile strength means a value obtained by dividing a load at a breaking point by a cross-sectional area. The average of tensile strengths of the test pieces was defined as σθ (θ=0°, +45°, +90°, and)−45°, and the average was defined as the tensile strength σrt2 of the porous sheet-shaped base material.

Evaluation Method 4: Tensile Strength σT2 of Porous Sheet-Shaped Base Material at Temperature T(° C.)

Using test pieces obtained by cutting the porous sheet-shaped base material in the same directions as in the evaluation of tensile strength σrt2 in Evaluation Method 3, tensile evaluation was performed in the same manner as in Evaluation Method 3 in a thermostatic chamber whose temperature was adjusted so that the temperature in the chamber would be the temperature T(° C.) obtained in Evaluation Method 1. The tensile strength obtained in the evaluation was defined as the tensile strength σT2 at the temperature T(° C.).

Evaluation Method 5: Tensile Test Method for Film-Shaped Base Material

A tensile test was performed using a tensile testing machine (5565 floor type universal testing system manufactured by Instron) according to JIS K 7127 (1999). The tensile test was performed at 25° C. and the temperature T(° C.) obtained in Evaluation Method 1. When the test was performed at the temperature T(° C.), a test piece was set in a thermostatic chamber whose inside temperature was T(° C.), left to stand for 5 minutes, and then subjected to a tensile test, and the tensile load F at the yield point was divided by the width W of the test piece to give the value X. When the tensile load F was below the detection limit of the testing machine, it was decided that the tensile load was unmeasurable, and the value X was judged to be less than 0.01 N/mm.

Materials Used

Thermosetting Resin (a-1)

In a kneader, 30 parts by mass of "jER (registered trademark)" 828 (manufactured by Mitsubishi Chemical Corporation), 35 parts by mass of "jER (registered trademark)" 1001, and 35 parts by mass of "jER (registered trademark)" 154 were charged, heated to 150° C. while being kneaded, and then kneaded at 150° C. for 1 hour to give a transparent viscous liquid. The viscous liquid was cooled to 60° C. while being kneaded, then 3.7 parts by mass of DYCY7 (manufactured by Mitsubishi Chemical Corporation) as a curing agent, 3 parts by mass of DCMU99 (manufactured by Hodogaya Chemical Co., Ltd.) as a curing accelerator, and 3 parts by mass of "Matsumoto Microsphere (registered trademark)" M (manufactured by Matsumoto Yushi-Seiyaku Co., Ltd.) as particles were blended, and the blend was kneaded at 60° C. for 30 minutes to prepare a thermosetting resin composition. The thermosetting resin composition was applied to release paper using a film coater to produce films of a thermosetting resin (a-1) each having a mass per unit area of 50 g/m² or 100 g/m². The characteristics of the thermosetting resin (a-1) are as shown in Table 1.

Thermosetting Resin (a-2)

In a kneader, 30 parts by mass of "jER (registered trademark)" 828 (manufactured by Mitsubishi Chemical Corporation), 35 parts by mass of "jER (registered trademark)" 1001, and 35 parts by mass of "jER (registered trademark)" 154 were charged, heated to 150° C. while being kneaded, and then kneaded at 150° C. for 1 hour to give a transparent viscous liquid. The viscous liquid was cooled to 60° C. while being kneaded, then 3.7 parts by mass of DYCY7 (manufactured by Mitsubishi Chemical Corporation) as a curing agent, 3 parts by mass of DCMU99 (manufactured by Hodogaya Chemical Co., Ltd.) as a curing accelerator, and 10 parts by mass of "Matsumoto Microsphere (registered trademark)" M (manufactured by Matsumoto Yushi-Seiyaku Co., Ltd.) as particles were blended, and the blend was kneaded at 60° C. for 30 minutes to prepare a thermosetting resin composition. The thermosetting resin composition was applied to release paper using a film coater to produce films of a thermosetting resin (a-2) each having a mass per unit area of 50 g/m$^2$ or 100 g/m$^2$. The characteristics of the thermosetting resin (a-2) are as shown in Table 1.

Thermosetting Resin (a-3)

In a kneader, 30 parts by mass of "jER (registered trademark)" 828 (manufactured by Mitsubishi Chemical Corporation), 20 parts by mass of "jER (registered trademark)" 1001, 15 parts by mass of "jER (registered trademark)" 1007, and 35 parts by mass of "jER (registered trademark)" 154 were charged, heated to 150° C. while being kneaded, and then kneaded at 150° C. for 1 hour to give a transparent viscous liquid. The viscous liquid was cooled to 60° C. while being kneaded, then 3.5 parts by mass of DYCY7 (manufactured by Mitsubishi Chemical Corporation) as a curing agent, 3 parts by mass of DCMU99 (manufactured by Hodogaya Chemical Co., Ltd.) as a curing accelerator, and 3 parts by mass of "Matsumoto Microsphere (registered trademark)" M (manufactured by Matsumoto Yushi-Seiyaku Co., Ltd.) as particles were blended, and the blend was kneaded at 60° C. for 30 minutes to prepare a thermosetting resin composition. The thermosetting resin composition was applied to release paper using a film coater to produce films of a thermosetting resin (a-3) each having a mass per unit area of 50 g/m$^2$ or 100 g/m$^2$. The characteristics of the thermosetting resin (a-3) are as shown in Table 1.

Thermosetting Resin (a-4)

In a kneader, 30 parts by mass of "jER (registered trademark)" 828 (manufactured by Mitsubishi Chemical Corporation), 35 parts by mass of "jER (registered trademark)" 1001, and 35 parts by mass of "jER (registered trademark)" 154 were charged, heated to 150° C. while being kneaded, and then kneaded at 150° C. for 1 hour to give a transparent viscous liquid. The viscous liquid was cooled to 60° C. while being kneaded, then 3.7 parts by mass of DYCY7 (manufactured by Mitsubishi Chemical Corporation) as a curing agent, 3 parts by mass of OMICURE 24 (manufactured by PTI JAPAN Corporation) as a curing accelerator, and 3 parts by mass of "Matsumoto Microsphere (registered trademark)" M (manufactured by Matsumoto Yushi-Seiyaku Co., Ltd.) as particles were blended, and the blend was kneaded at 60° C. for 30 minutes to prepare a thermosetting resin composition. The thermosetting resin composition was applied to release paper using a film coater to produce films of a thermosetting resin (a-4) each having a mass per unit area of 50 g/m$^2$ or 100 g/m$^2$. The characteristics of the thermosetting resin (a-4) are as shown in Table 1.

Thermosetting Resin (a-5)

In a kneader, 20 parts by mass of "jER (registered trademark)" 828 (manufactured by Mitsubishi Chemical Corporation), 40 parts by mass of "jER (registered trademark)" 1001, and 40 parts by mass of "SUMI-EPDXY (registered trademark)" ELM434 were charged, heated to 150° C. while being kneaded, and then kneaded at 150° C. for 1 hour to give a transparent viscous liquid. The viscous liquid was cooled to 60° C. while being kneaded, then 4.8 parts by mass of DYCY7 (manufactured by Mitsubishi Chemical Corporation) as a curing agent, 2 parts by mass of DCMU99 (manufactured by Hodogaya Chemical Co., Ltd.) as a curing accelerator, and 3 parts by mass of "Matsumoto Microsphere (registered trademark)" M (manufactured by Matsumoto Yushi-Seiyaku Co., Ltd.) as particles were blended, and the blend was kneaded at 60° C. for 30 minutes to prepare a thermosetting resin composition. The thermosetting resin composition was applied to release paper using a film coater to produce films of a thermosetting resin (a-5) each having a mass per unit area of 50 g/m$^2$ or 100 g/m$^2$. The characteristics of the thermosetting resin (a-5) are as shown in Table 1.

Thermosetting Resin (a-6)

In a kneader, 100 parts by mass of "jER (registered trademark)" 828 (manufactured by Mitsubishi Chemical Corporation) was charged, heated to 150° C. while being kneaded, and then kneaded at 150° C. for 1 hour to give a transparent viscous liquid. The viscous liquid was cooled to 60° C. while being kneaded, then 4.2 parts by mass of DYCY7 (manufactured by Mitsubishi Chemical Corporation) as a curing agent and 3 parts by mass of DCMU99 (manufactured by Hodogaya Chemical Co., Ltd.) as a curing accelerator were blended, and the blend was kneaded at 60° C. for 30 minutes to prepare a thermosetting resin composition. The thermosetting resin composition was applied to release paper using a film coater to produce films of a thermosetting resin (a-6) each having a mass per unit area of 50 g/m$^2$ or 100 g/m$^2$. The characteristics of the thermosetting resin (a-6) are as shown in Table 1.

Thermosetting Resin (a-7)

In a kneader, 20 parts by mass of "jER (registered trademark)" 828 (manufactured by Mitsubishi Chemical Corporation), 40 parts by mass of "jER (registered trademark)" 1007, and 40 parts by mass of "jER (registered trademark)" 154 were charged, heated to 150° C. while being kneaded, and then kneaded at 150° C. for 1 hour to give a transparent viscous liquid. The viscous liquid was cooled to 60° C. while being kneaded, then 3.3 parts by mass of DYCY7 (manufactured by Mitsubishi Chemical Corporation) as a curing agent and 3 parts by mass of DCMU99 (manufactured by Hodogaya Chemical Co., Ltd.) as a curing accelerator were blended, and the blend was kneaded at 60° C. for 30 minutes to prepare a thermosetting resin composition. The thermosetting resin composition was applied to release paper using a film coater to produce films of a thermosetting resin (a-7) each having a mass per unit area of 50 g/m$^2$ or 100 g/m$^2$. The characteristics of the thermosetting resin (a-7) are as shown in Table 1.

Porous Sheet-Shaped Base Material (b-1)

A urethane foam "MORTOPREN (registered trademark)" ER-1 manufactured by INOAC CORPORATION was prepared as a porous sheet-shaped base material (b-1). The characteristics of the porous sheet-shaped base material (b-1) were as shown in Table 2. Porous sheet-shaped base material (b-2)

A silicon foam "NanNex (registered trademark)" HT-800 manufactured by ROGERS INOAC CORPORATION was prepared as a porous sheet-shaped base material (b-2). The characteristics of the porous sheet-shaped base material (b-2) are as shown in Table 2.

Film-Shaped Base Material (c-1)

A film was produced by a pressing machine using pellets of a thermoplastic resin (J106MG (polypropylene pellets manufactured by Prime Polymer Co., Ltd., melting point: 165° C.)) to give a film-shaped base material (c-1). The thickness of the film-shaped base material (c-1) was 93 μm.

Fiber-Reinforced Base Material (A-1)

"Torayca" cloth, C06343B (plain weave, fiber basis weight: 198 g/m$^2$) manufactured by Toray Industries, Inc. was used as a fiber-reinforced base material (A-1).

Thermosetting Resin Base Material (B-1)

One layer of the thermosetting resin (a-1) having a mass per unit area of 50 g/m$^2$ and seven layers of the thermosetting resin (a-1) each having a mass per unit area of 100 g/m$^2$ were laminated to form a total of eight layers of the thermosetting resin (a-1) collectively having a mass per unit area of 750 g/m$^2$. The porous sheet-shaped base material (b-1) and the thermosetting resin (a-1) having a mass per unit area of 750 g/m$^2$ were laminated to have a structure of thermosetting resin (a-1)/porous sheet-shaped base material (b-1)/thermosetting resin (a-1), and heated in a pressing machine temperature-controlled to 70° C. under pressurization with a surface pressure of 0.1 MPa for 1.5 hours to produce a thermosetting resin base material (B-1). The characteristics of the thermosetting resin base material (B-1) are summarized in Table 3.

Thermosetting Resin Base Material (B-2)

A thermosetting resin base material (B-2) was produced by the same method as that for producing the thermosetting resin base material (B-1) except that the thermosetting resin (a-2) was used instead of the thermosetting resin (a-1). The characteristics of the thermosetting resin base material (B-2) are summarized in Table 3.

Thermosetting Resin Base Material (B-3)

A thermosetting resin base material (B-3) was produced by the same method as that for producing the thermosetting resin base material (B-1) except that the thermosetting resin (a-3) was used instead of the thermosetting resin (a-1). The characteristics of the thermosetting resin base material (B-3) are summarized in Table 3.

Thermosetting Resin Base Material (B-4)

A thermosetting resin base material (B-4) was produced by the same method as that for producing the thermosetting resin base material (B-1) except that the thermosetting resin (a-4) was used instead of the thermosetting resin (a-1). The characteristics of the thermosetting resin base material (B-4) are summarized in Table 3.

Thermosetting Resin Base Material (B-5)

A thermosetting resin base material (B-5) was produced by the same method as that for producing the thermosetting resin base material (B-1) except that the thermosetting resin (a-5) was used instead of the thermosetting resin (a-1). The characteristics of the thermosetting resin base material (B-5) are summarized in Table 3.

Thermosetting Resin Base Material (B-6)

A thermosetting resin base material (B-6) was produced by the same method as that for producing the thermosetting resin base material (B-1) except that the thermosetting resin (a-6) was used instead of the thermosetting resin (a-1). The characteristics of the thermosetting resin base material (B-6) are summarized in Table 4.

Thermosetting Resin Base Material (B-7)

A thermosetting resin base material (B-7) was produced by the same method as that for producing the thermosetting resin base material (B-1) except that the thermosetting resin (a-7) was used instead of the thermosetting resin (a-1). The characteristics of the thermosetting resin base material (B-7) are summarized in Table 4.

Thermosetting Resin Base Material (B-8)

A thermosetting resin base material (B-8) was produced by the same method as that for producing the thermosetting resin base material (B-1) except that the porous sheet-shaped base material (b-2) was used instead of the porous sheet-shaped base material (b-1). The characteristics of the thermosetting resin base material (B-8) are summarized in Table 4.

Thermosetting resin base material (B-9)

One layer of the thermosetting resin (a-1) having a mass per unit area of 50 g/m$^2$ and seven layers of the thermosetting resin (a-1) each having a mass per unit area of 100 g/m$^2$ were laminated to form a total of eight layers of the thermosetting resin (a-1) collectively having a mass per unit area of 750 g/m$^2$. The obtained layers of the thermosetting resin (a-1) were sandwiched between two film-shaped base materials (c-1), and four sides of the film-shaped base materials were heat-sealed at a position of 1 cm from the edge to give a thermosetting resin base material (B-9). The characteristics of the thermosetting resin base material (B-9) are summarized in Table 4.

TABLE 1

| | | | Thermosetting resin | | | | | | |
| --- | --- | --- | --- | --- | --- | --- | --- | --- | --- |
| | | | a-1 | a-2 | a-3 | a-4 | a-5 | a-6 | a-7 |
| Thermosetting resin Composition | Epoxy resin | jER 828 | 30 | 30 | 30 | 30 | 20 | 100 | 20 |
| | | jER 1001 | 35 | 35 | 20 | 35 | 40 | | |
| | | jER 1007 | | | 15 | | | | 40 |
| | | ELM 434 | | | | | 40 | | |
| | | jER 154 | 35 | 35 | 35 | 35 | | | 40 |
| | Particles | Matsumoto Microsphere M | 3 | 10 | 3 | 3 | 3 | | |
| | Curing agent | DYCY7 | 3.7 | 3.7 | 3.5 | 3.7 | 4.8 | 4.2 | 3.3 |
| | Curing accelerator | DCMU99 | 3 | 3 | 3 | | 2 | 3 | 3 |
| | | OMICURE 24 | | | | 3 | | | |

TABLE 1-continued

| | | Thermosetting resin | | | | | | |
|---|---|---|---|---|---|---|---|---|
| | | a-1 | a-2 | a-3 | a-4 | a-5 | a-6 | a-7 |
| Characteristics of uncured resin | Resin viscosity at 40° C. η1 (Pa · s) | 1300 | 7200 | 3100 | 1300 | 2800 | 430 | 18200 |
| | Minimum viscosity η2 (Pa · s) | 2.5 | 9.5 | 4.6 | 4 | 6.1 | 0.2 | 126 |
| | Cure index after heated at 150° C. for 5 minutes (%) | 80 | 78 | 82 | 94 | 85 | 78 | 80 |

TABLE 2

| | Porous sheet-shaped base material | |
|---|---|---|
| | b-1 | b-2 |
| Tensile strength σrt2 at 40° C. (MPa) | 0.11 | 0.50 |
| Basis weight (g/m$^2$) | 175 | 500 |
| Constituent material | Urethane | Silicon |

TABLE 3

| | | Thermosetting resin base material | | | | |
|---|---|---|---|---|---|---|
| | | B-1 | B-2 | B-3 | B-4 | B-5 |
| Construction | Thermosetting resin | a-1 | a-2 | a-3 | a-4 | a-5 |
| | Porous sheet-shaped base material | b-1 | b-1 | b-1 | b-1 | b-1 |
| | Film-shaped base material | — | — | — | — | — |
| Characteristics of thermosetting resin | Viscosity at 40° C. (Pa · s) | 1300 | 7200 | 3100 | 1300 | 2800 |
| | Minimum viscosity (Pa · s) | 2.5 | 9.5 | 4.6 | 4 | 6.1 |
| | Cure index (%) | 80 | 78 | 82 | 94 | 85 |
| Characteristics of porous sheet-shaped base material | Tensile strength σrt2 (MPa) | 0.11 | 0.11 | 0.11 | 0.11 | 0.11 |
| | Tensile strength σT2 (MPa) | 0.01 | 0.02 | 0.02 | 0.01 | 0.02 |
| | Tensile strength ratio σr2 | 0.09 | 0.18 | 0.18 | 0.09 | 0.18 |
| Characteristics of film-shaped base material | Value X at 25° C. (N/mm) | — | — | — | — | — |
| | Value X at T (° C.) (N/mm) | — | — | — | — | — |

TABLE 4

| | | Thermosetting resin base material | | | |
|---|---|---|---|---|---|
| | | B-6 | B-7 | B-8 | B-9 |
| Construction | Thermosetting resin | a-6 | a-7 | a-1 | a-1 |
| | Porous sheet-shaped base material | b-1 | b-1 | b-2 | — |
| | Film-shaped base material | — | — | — | c-1 |
| Characteristics of thermosetting resin | Viscosity at 40° C. (Pa · s) | 430 | 18200 | 1300 | 1300 |
| | Minimum viscosity (Pa · s) | 0.2 | 126 | 2.5 | 2.5 |
| | Cure index (%) | 78 | 80 | 80 | 80 |
| Characteristics of porous sheet-shaped base material | Tensile strength σrt2 (MPa) | 0.11 | 0.11 | 0.50 | — |
| | Tensile strength σT2 (MPa) | 0.03 | 0.02 | 0.30 | — |
| | Tensile strength ratio σr2 | 0.27 | 0.18 | 0.60 | — |
| Characteristics of film-shaped base material | Value X at 25° C. (N/mm) | — | — | — | 4.3 |
| | Value X at T (° C.) (N/mm) | — | — | — | 0.1 |

Example 11

Two layers of the fiber-reinforced base materials (A-1) were laminated on each of the front and back of the thermosetting resin base material (B-1), that is, the fiber-reinforced base materials (A-1) and the thermosetting resin base material (B-1) were laminated to have a structure of fiber-reinforced base material (A-1)/fiber-reinforced base material (A-1)/thermosetting resin base material (B-1)/fiber-reinforced base material (A-1)/fiber-reinforced base material (A-1) to produce a laminate. The laminate was placed in double-sided dies attached to a pressing machine, and the double-sided dies were clamped and a surface pressure of 1 MPa was applied. The heating plate provided in the pressing machine was temperature-controlled, and the double-sided dies were heated from room temperature (25° C.) to 150° C. at a temperature rise rate of 1.5° C./min and held for 10 minutes after reaching 150° C. to produce a fiber reinforced composite material. After 10 minutes of the holding, the pressure on the double-sided dies was released, and a fiber reinforced composite material (11) was demolded. The thermosetting resin in the fiber reinforced composite material (11) was sufficiently cured, and the fiber reinforced composite material (11) was demoldable.

The surface quality of the fiber reinforced composite material (11) was good. As a result of cross-sectional observation, no voids were observed in layers including the fiber-reinforced base material (A-1) and the thermosetting resin (a-1). In this example, the presence or absence of voids was judged by the presence or absence of voids having a diameter of 5 μm or more in a microscope observation image.

Example 12

A fiber reinforced composite material (12) was produced by a method similar to that in Example 11 except that the thermosetting resin base material (B-2) was used instead of the thermosetting resin base material (B-1). The thermosetting resin in the fiber reinforced composite material (12) was sufficiently cured, and the fiber reinforced composite material (12) was demoldable.

The surface quality of the fiber reinforced composite material (12) was good. As a result of cross-sectional observation, no voids were observed in layers including the fiber-reinforced base material (A-1) and the thermosetting resin (a-2). In this example, the presence or absence of voids was judged by the presence or absence of voids having a diameter of 5 μm or more in a microscope observation image.

Example 13

A fiber reinforced composite material (13) was produced by a method similar to that in Example 11 except that the thermosetting resin base material (B-3) was used instead of the thermosetting resin base material (B-1). The thermosetting resin in the fiber reinforced composite material (13) was sufficiently cured, and the fiber reinforced composite material (13) was demoldable.

The surface quality of the fiber reinforced composite material (13) was good. As a result of cross-sectional observation, no voids were observed in layers including the fiber-reinforced base material (A-1) and the thermosetting resin (a-3). In this example, the presence or absence of voids was judged by the presence or absence of voids having a diameter of 5 μm or more in a microscope observation image.

Example 14

A fiber reinforced composite material (14) was produced by a method similar to that in Example 11 except that the thermosetting resin base material (B-4) was used instead of the thermosetting resin base material (B-1), and the holding time at 150° C. was changed to 5 minutes. The thermosetting resin in the fiber reinforced composite material (14) was sufficiently cured, and the fiber reinforced composite material (14) was demoldable.

The surface quality of the fiber reinforced composite material (14) was good. As a result of cross-sectional observation, no voids were observed in layers including the fiber-reinforced base material (A-1) and the thermosetting resin (a-4). In this example, the presence or absence of voids was judged by the presence or absence of voids having a diameter of 5 μm or more in a microscope observation image.

Example 15

A fiber reinforced composite material (15) was produced by a method similar to that in Example 11 except that the thermosetting resin base material (B-5) was used instead of the thermosetting resin base material (B-1), and the holding time at 150° C. was changed to 5 minutes. The thermosetting resin in the fiber reinforced composite material (15) was sufficiently cured, and the fiber reinforced composite material (15) was demoldable.

The surface quality of the fiber reinforced composite material (15) was good. As a result of cross-sectional observation, no voids were observed in layers including the fiber-reinforced base material (A-1) and the thermosetting resin (a-5). In this example, the presence or absence of voids was judged by the presence or absence of voids having a diameter of 5 μm or more in a microscope observation image.

Example 16

A fiber reinforced composite material (16) was produced by a method similar to that in Example 11 except that the thermosetting resin base material (B-8) was used instead of the thermosetting resin base material (B-1). The thermosetting resin base material (B-8) had good handleability in the lamination and conveying steps. The thermosetting resin in the fiber reinforced composite material (16) was sufficiently cured, and the fiber reinforced composite material (16) was demoldable.

The surface quality of the fiber reinforced composite material (16) was good. As a result of cross-sectional observation, no voids were observed in layers including the fiber-reinforced base material (A-1) and the thermosetting resin (a-1). In this example, the presence or absence of voids was judged by the presence or absence of voids having a diameter of 5 μm or more in a microscope observation image.

Example 17

A fiber reinforced composite material (17) was produced by a method similar to that in Example 11 except that the thermosetting resin base material (B-9) was used instead of the thermosetting resin base material (B-1). The thermosetting resin in the fiber reinforced composite material (17) was sufficiently cured, and the fiber reinforced composite material (17) was demoldable.

The surface quality of the fiber reinforced composite material (17) was good. As a result of cross-sectional observation, no voids were observed in layers including the fiber-reinforced base material (A-1) and the thermosetting resin (a-1). In this example, the presence or absence of voids was judged by the presence or absence of voids having a diameter of 5 μm or more in a microscope observation image.

Example 18

Two layers of the fiber-reinforced base materials (A-1) were laminated on each of the front and back of the thermosetting resin base material (B-1), that is, the fiber-reinforced base materials (A-1) and the thermosetting resin base material (B-1) were laminated to have a structure of fiber-reinforced base material (A-1)/fiber-reinforced base material (A-1)/thermosetting resin base material (B-1)/fiber-reinforced base material (A-1)/fiber-reinforced base material (A-1) to produce a laminate. The laminate was placed in a single-sided die, the periphery of the single-sided die was covered with a sealing material (a cover film and the die were brought into close contact with each other, and the inside of the die was sealed), and then a bleeder (that plays a role of a spacer as a passage of air and resin) made of a thick nonwoven fabric was placed on the outer periphery of the laminate. A tube as a suction port was provided on the bleeder, and the sealing material and the cover film were brought into close contact with each other so that the cover film would cover the single-sided die. For the cover film, a flexible cover film was used. A vacuum pump was connected to the tube as a suction port, and the air inside the molding space (a space including the laminate formed of the single-sided die and the cover film) was sucked to depressurize the molding space, whereby the laminate was pressurized. Then, the single-sided die was placed in an oven temperature-controlled to 150° C. and held for 30 minutes to produce a fiber reinforced composite material (18). After 30 minutes of the holding, the single-sided die was taken out, and the fiber reinforced composite material (18) was demolded.

The surface quality of the fiber reinforced composite material (18) was good. As a result of observation of the surface with a microscope, no voids were observed. In addition, as a result of cross-sectional observation, no voids were observed in layers including the fiber-reinforced base material (A-1) and the thermosetting resin (a-1). In this example, the presence or absence of voids was judged by the presence or absence of voids having a diameter of 5 µm or more in a microscope observation image.

Example 19

A polypropylene bladder was prepared as a hollow core die, and base materials were laminated on the whole outer periphery of the bladder to have a structure of (bladder)/fiber-reinforced base material (A-1)/fiber-reinforced base material (A-1)/thermosetting resin base material (B-1)/fiber-reinforced base material (A-1)/fiber-reinforced base material (A-1)/(outer surface) and temporarily fastened to produce a preform. Split hollow dies that form a cavity simulating the shape of a wind turbine blade were opened, the preform was fed to the cavity, the dies were clamped, and then compressed air was flowed into the hollow portion of the bladder to inflate the bladder, whereby the hollow portion of the hollow dies was pressurized. Then, the hollow dies were placed in an oven temperature-controlled to 150° C. and held for 30 minutes to produce a fiber reinforced composite material (19). After 30 minutes of the holding, the hollow dies were taken out, the fiber reinforced composite material (19) was demolded, and the bladder was removed from the fiber reinforced composite material (19).

The surface quality of the fiber reinforced composite material (19) was good. As a result of cross-sectional observation, no voids were observed in layers including the fiber-reinforced base material (A-1) and the thermosetting resin (a-1). In this example, the presence or absence of voids was judged by the presence or absence of voids having a diameter of 5 µm or more in a microscope observation image. In addition, the fiber reinforced composite material (19) had a hollow structure.

Example 20

A fiber reinforced composite material (20) was produced by a method similar to that in Example 1 except that the prepared fiber-reinforced base material (A-1) was larger in size than the thermosetting resin base material (B-1), and two layers of the fiber-reinforced base materials (A-1) were laminated on each of the front and back of the thermosetting resin base material (B-1), that is, the fiber-reinforced base materials (A-1) and the thermosetting resin base material (B-1) were laminated to have a structure of fiber-reinforced base material (A-1)/fiber-reinforced base material (A-1)/thermosetting resin base material (B-1)/fiber-reinforced base material (A-1)/fiber-reinforced base material (A-1) to produce a laminate having a structure of ends as shown in FIG. 10. The thermosetting resin in the fiber reinforced composite material (20) was sufficiently cured, and the fiber reinforced composite material (20) was demoldable.

The surface quality of the fiber reinforced composite material (20) was good. The thermosetting resin (a-1) was impregnated also into the fiber-reinforced base material (A-1) covering the ends, and no leakage of the thermosetting resin (a-1) was observed in the molding process. As a result of cross-sectional observation, no voids were observed in layers including the fiber-reinforced base material (A-1) and the thermosetting resin (a-1). In this example, the presence or absence of voids was judged by the presence or absence of voids having a diameter of 5 µm or more in a microscope observation image.

Example 21

A fiber reinforced composite material (21) was produced by a method similar to that in Example 11 except that five layers in total of the fiber-reinforced base materials (A-1) and the thermosetting resin base materials (B-1) were alternately laminated to have a structure of fiber-reinforced base material (A-1)/thermosetting resin base material (B-1)/fiber-reinforced base material (A-1)/thermosetting resin base material (B-1)/fiber-reinforced base material (A-1) to produce a laminate. The thermosetting resin in the fiber reinforced composite material (21) was sufficiently cured, and the fiber reinforced composite material (21) was demoldable.

The surface quality of the fiber reinforced composite material (21) was good. As a result of cross-sectional observation, no voids were observed in the outermost layers and the intermediate layer each including the fiber-reinforced base material (A-1) and the thermosetting resin (a-1). In this example, the presence or absence of voids was judged by the presence or absence of voids having a diameter of 5 µm or more in a microscope observation image.

Example 22

In addition to the fiber-reinforced base materials (A-1) and the thermosetting resin base materials (B-1), "Achilles board (registered trademark)" manufactured by ACHILLES CORPORATION was used as the core material (C), and the base materials and the core material were laminated to have a structure of fiber-reinforced base material (A-1)/fiber-reinforced base material (A-1)/fiber-reinforced base material (A-1)/thermosetting resin base material (B-1)/fiber-reinforced base material (A-1)/core material (C)/fiber-reinforced base material (A-1)/thermosetting resin base material (B-1)/fiber-reinforced base material (A-1)/fiber-reinforced base material (A-1)/fiber-reinforced base material (A-1) to produce a laminate. The laminate was placed in a single-sided die, the periphery of the single-sided die was covered with a sealing material (a cover film and the die were brought into close contact with each other, and the inside of the die was sealed), and then a bleeder (that plays a role of a spacer as a passage of air and resin) made of a thick nonwoven fabric was placed on the outer periphery of the laminate. A tube as a suction port was provided on the bleeder, and the sealing material and the cover film were brought into close contact with each other so that the cover film would cover the single-sided die. For the cover film, a flexible cover film was used. A vacuum pump was connected to the tube as a suction port, and the air inside the molding space (a space including the laminate formed of the single-sided die and the cover film) was sucked to depressurize the molding space, whereby the laminate was pressurized. Then, the single-sided die was placed in an oven temperature-controlled to 130° C. and held for 60 minutes to produce a fiber reinforced composite material (22). After 60 minutes of the holding, the single-sided die was taken out, and the fiber reinforced composite material (22) was demolded.

The surface quality of the fiber reinforced composite material (22) was good. The fiber reinforced composite material (22) had voids, and was thick and light. As a result of cross-sectional observation, no voids were observed in layers including the fiber-reinforced base material (A-1) and the thermosetting resin (a-1). In this example, the presence or absence of voids was judged by the presence or absence of voids having a diameter of 5 µm or more in a microscope observation image.

Comparative Example 11

A trial was made to produce a laminate by laminating two layers of the fiber-reinforced base materials (A-1) on each of the front and back of the thermosetting resin base material (B-6), that is, the fiber-reinforced base materials (A-1) and the thermosetting resin base material (B-6) were to be laminated to have a structure of fiber-reinforced base material (A-1)/fiber-reinforced base material (A-1)/thermosetting resin base material (B-6)/fiber-reinforced base material (A-1)/fiber-reinforced base material (A-1). However, the thermosetting resin (a-6) dripped from the thermosetting resin base material (B-6) during the conveyance to contaminate the workplace, and the intended laminate was not produced.

Comparative Example 12

Two layers of the fiber-reinforced base materials (A-1) were laminated on each of the front and back of the thermosetting resin base material (B-7), that is, the fiber-reinforced base materials (A-1) and the thermosetting resin base material (B-7) were laminated to have a structure of fiber-reinforced base material (A-1)/fiber-reinforced base material (A-1)/thermosetting resin base material (B-7)/fiber-reinforced base material (A-1)/fiber-reinforced base material (A-1) to produce a laminate. The laminate was placed in double-sided dies attached to a pressing machine, and the double-sided dies were raised and lowered to apply a surface pressure of 1 MPa. The heating plate provided in the pressing machine was temperature-controlled, and the double-sided dies were heated from room temperature (25° C.) to 150° C. at a temperature rise rate of 1.5° C./min and held for 10 minutes after reaching 150° C. to produce a fiber reinforced composite material. After 10 minutes of the holding, the pressure on the double-sided dies was released, and a fiber reinforced composite material (23) was demolded. The thermosetting resin in the fiber reinforced composite material (23) was sufficiently cured, and the fiber reinforced composite material (23) was demoldable.

The surface of the fiber reinforced composite material (23) included many unimpregnated regions, and a region where a dry fiber-reinforced base material (A-1) was exposed was also observed.

INDUSTRIAL APPLICABILITY

It is possible to provide a method of producing a fiber reinforced composite material capable of improving the formativeness and productivity without deteriorating the quality of the molded article by using a thermosetting resin base material capable of suitably impregnating a thermosetting resin into a fiber-reinforced base material and is excellent in handleability.

The invention claimed is:

1. A method of producing a fiber reinforced composite material by impregnating a fiber-reinforced base material (A) with a thermosetting resin (a) and further curing the thermosetting resin (a), the method comprising steps (II) to (IV):

step (II): feeding the fiber-reinforced base material (A) containing no resin and a thermosetting resin base material (B) satisfying condition 1 and/or condition 2 to a molding mechanism, the thermosetting resin base material (B) being fed to the molding mechanism with at least one side surface of the thermosetting resin base material (B) being sealed with the fiber-reinforced base material (A);

step (III): supplying the thermosetting resin (a) from the thermosetting resin base material (B) to the fiber-reinforced base material (A) by pressurization with the molding mechanism to impregnate the fiber-reinforced base material (A) with the thermosetting resin (a); and step (IV): curing the thermosetting resin (a) by heating with the molding mechanism:

condition 1: the thermosetting resin base material (B) includes the thermosetting resin (a) and a nonwoven fabric-shaped base material, and is prepared by making the thermosetting resin (a) permeate into the nonwoven fabric-shaped base material a thermosetting resin base material satisfying the condition 1 is referred to as a thermosetting resin base material (B-1); and condition 2: the thermosetting resin base material (B) is a base material including the thermosetting resin (a), and a porous sheet-shaped base material (b) or a film-shaped base material (c), the thermosetting resin (a) has a viscosity of 1,000 Pa·s or more at 40° C., the thermosetting resin (a) has a minimum viscosity of 10 Pa·s or less during heating from 30° C. at a temperature rise rate of 1.5° C./min, when the porous sheet-shaped base material (b) is included in the base material, the thermosetting resin base material (B) is prepared by causing the thermosetting resin (a) to permeate into the porous sheet-shaped base material (b), and when the film-shaped base material (c) is included in the base material, the thermosetting resin base material (B) is prepared by placement in a bag formed of the film-shaped base material (c) (a thermosetting resin base material satisfying the condition 2 is referred to as a thermosetting resin base material (B-2)).

2. The method according to claim 1, wherein the thermosetting resin (a) has a cure index of 85% or more as measured by an ion viscometer after heated at 150° C. for 5 minutes.

3. The method according to claim 1, the method further comprising step (I) before step (II):

step (I): when the thermosetting resin base material (B) satisfies the condition 1, making the nonwoven fabric-shaped base material support the thermosetting resin (a), and when the thermosetting resin base material (B) satisfies the condition 2, making the porous sheet-shaped base material (b) or the film-shaped base material (c) support the thermosetting resin (a) to prepare the thermosetting resin base material (B).

4. The method according to claim 1, further comprising preliminarily heating the thermosetting resin base material (B) before step (II).

5. The method according to claim 1, wherein the pressurization in step (III) and the heating in step (IV) are performed simultaneously.

6. The method according to claim 1, wherein, in step (III), the thermosetting resin base material (B) has an in-plane elongation ratio that is represented by a formula of 1.2 or less by the pressurization:

in-plane elongation ratio=(projected area after pressurization)/(projected area before pressurization).

7. The method material according to claim 1, wherein the molding mechanism has a pair of double-sided dies, and a preform including the fiber-reinforced base material (A) and the thermosetting resin base material (B) is molded in the double-sided dies.

8. The method according to claim 7, wherein, in step (III), clamping is started at a first surface pressure, and completed at a second surface pressure higher than the first surface pressure.

9. The method according to claim 1, wherein the molding mechanism has a single-sided die, and a preform including the fiber-reinforced base material (A) and the thermosetting resin base material (B) is placed in the single-sided die, further packed with a cover film, and molded.

10. The method according to claim 1, wherein the molding mechanism has a hollow die, a preform including the fiber-reinforced base material (A) and the thermosetting resin base material (B) is placed in a hollow portion, and the hollow portion is pressurized.

11. The method according to claim 10, wherein the molding mechanism further has a core die.

12. The method according to claim 1, wherein in step (II), the fiber-reinforced base material (A) and the thermosetting resin base material (B) are elongated, and the fiber-reinforced base material (A) and the thermosetting resin base material (B) are continuously fed to the molding mechanism.

13. The method according to claim 12, wherein the molding mechanism has a mechanism that takes up the fiber-reinforced base material (A) and the thermosetting resin base material (B) while pressurizing the fiber-reinforced base material (A) and the thermosetting resin base material (B).

14. The method according to claim 1, wherein, in step (II), the thermosetting resin base material (B) is covered with the fiber-reinforced base material (A).

15. The method according to claim 1, wherein, in step (II), the fiber-reinforced base material (A) is fed to the molding mechanism in a state where the fiber-reinforced base material (A) is in contact with the molding mechanism, and at least a part of the thermosetting resin base material (B) is covered with the fiber-reinforced base material (A).

16. The method according to claim 1, wherein, in step (II), the fiber-reinforced base material (A) and the thermosetting resin base material (B) are fed to the molding mechanism in a state where the fiber-reinforced base material (A) is in direct contact with the thermosetting resin base material (B).

17. The method according to claim 1, wherein, in step (II), an alternate laminate of a total of four or more layers of the fiber-reinforced base material (A) and the thermosetting resin base material (B) is fed to the molding mechanism.

18. The method according to claim 1, wherein, in step (II), a core material (C) is further fed to the molding mechanism.

19. The method according to claim 1, wherein the porous sheet-shaped base material (b) has characteristics including a tensile strength $\sigma rt2$ at 40° C. of 0.5 MPa or more and a tensile strength ratio $\sigma r2$ represented by a formula of 0.5 or more:

$\sigma r2 = \sigma T2/\sigma rt2$ wherein $\sigma T2$ is a tensile strength of the porous sheet-shaped base material (b) at a temperature T(° C.), and
T is a temperature at which the thermosetting resin (a) exhibits the minimum viscosity during heating from 30° C. at a temperature rise rate of 1.5° C./min.

20. The method according to claim 1, wherein the condition 1 further stipulates that the thermosetting resin (a) has a viscosity of 1,000 Pa·s or more at 40° C., and the thermosetting resin (a) has a minimum viscosity of 10 Pa·s or less during heating from 30° C. at a temperature rise rate of 1.5° C./min.

* * * * *